United States Patent
Nakamoto

(10) Patent No.: US 6,253,290 B1
(45) Date of Patent: Jun. 26, 2001

(54) MULTIPROCESSOR SYSTEM CAPABLE OF CIRCUMVENTING WRITE MONITORING OF CACHE MEMORIES

(75) Inventor: Yukio Nakamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/247,519

(22) Filed: Feb. 10, 1999

(30) Foreign Application Priority Data

Sep. 4, 1998 (JP) .................................................. 10-251652

(51) Int. Cl.[7] ........................................................ G06F 12/00
(52) U.S. Cl. ........................ 711/138; 711/130; 711/147; 711/141; 709/213; 709/215
(58) Field of Search ........................................ 711/138, 139, 711/141, 144, 145, 146, 147, 130, 153; 709/213, 215

(56) References Cited

U.S. PATENT DOCUMENTS

| 4,939,641 | 7/1990 | Schwartz et al. ............... 364/200 |
| 5,890,216 | * 3/1999 | Derrick et al. ................. 711/138 |
| 6,138,216 | * 10/2000 | Harvey ........................... 711/139 |

FOREIGN PATENT DOCUMENTS

| 2-22757 | 1/1990 | (JP) . |
| 4-175946 | 6/1992 | (JP) . |

* cited by examiner

*Primary Examiner*—Kevin Verbrugge
(74) *Attorney, Agent, or Firm*—Burns, Doane, Swecker & Mathis, LLP

(57) ABSTRACT

A multiprocessor system having a plurality of processor units each including a CPU and a local cache memory connected to the CPU. The CPUs have their shared bus terminals connected to a global shared bus, and the local cache memories have their bus terminals connected to a global unshared bus. The global shared bus is connected to an external shared memory for storing shared information used in common by the CPUs, and the global unshared bus is connected to an external unshared memory for storing unshared information used by the CPUs. This configuration can solve a problem of a conventional multiprocessor system in that it takes a rather long time for a cache memory to monitor write operations of the other cache memories, its processing speed is reduced because write back caches cannot be used, and its cost is increased because inexpensive caches cannot be used.

18 Claims, 21 Drawing Sheets

Memory Map(Example)

MULTIPROCESSOR SYSTEM CAPABLE OF CIRCUMVENTING WRITE MONITORING OF CACHE MEMORIES

BACKGROUND OF THE INVENTION

1. Field of the Invention

The present invention relates to a multiprocessor including a plurality of processor units connected in common to a global bus.

2. Description of Related Art

FIG. 21 is a block diagram showing a conventional multiprocessor. In FIG. 21, the reference numerals 1 and 1A each designate a processor unit comprising a CPU 5, and a local cache memory 6 with a write through function and a write monitoring function. The local cache memory 6 of each of the processors 1 and 1A is connected to a common global bus 2 which is connected to an external memory 4 through an interface 3. Incidentally, an instruction cache is not shown, because not the instruction cache but the data cache is a subject matter here.

Next, the operation of the conventional multiprocessor will be described.

The CPU 5 exchanges data with the external memory 4 through the global bus 2 and interface 3. A low processing rate of the global bus 2 and interface 3, however, causes a bottleneck, and hinders the CPU 5 from achieving its original processing rate.

Thus, various schemes are proposed which can improve the rate by storing nearby the CPU 5 some contents of the external memory 4 that are used frequently by the CPU 5. The local cache memory 6 is placed close to the CPU 5 for that purpose.

The operation of the local cache memory 6 will now be described.

1. Read Operation of the Local Cache Memory 6.

Assume that the CPU 5 reads address 0013 of the external memory 4. The local cache memory 6 checks if it possesses the content of the address 0013. If it has, it provides the CPU 5 with the content of the address 0013. As a result, the CPU 5 can operate at its original high rate without using the low speed global bus 2 and interface 3.

Unless the local cache memory 6 possesses the content of the address 0013, it selects its storing content which will not be used by the CPU 5 for a considerable time from now on (the selection method is omitted here because it is not a subject matter of the present invention), erases the stored content (eliminates it from the cache after writing it in the external memory as will be described later), and transfer the content of the address 0013 to that space. Thus, the CPU 5 can read the content of the address 0013 quickly thereafter because the local cache memory 6 holds the content of the address 0013. This mechanism is referred to as "purge".

2. Write Operation of the Local Cache Memory 6.

There are two methods for the CPU 5 to write data to the external memory 4: A write back method and a write through method.

First, the write through method will be described. When the CPU 5 writes data to the address 0013 of the external memory 4, the local cache memory 6 checks whether it holds the content of the address 0013 as in the read operation. If the local cache memory 6 possesses the content of the address 0013, the local cache memory 6 updates the content of the address 0013 of itself and that of the external memory 4. Unless the local cache memory 6 holds the content of the address 0013, it eliminates a content which it considers that the CPU 5 will not use, and writes the content of the address 0013 into that space and the corresponding address of the external memory 4. As a result, the global bus 2 and interface 3 with the low operation rate are used at every write operation.

Second, the write back method will be described. The write back method differs from the write through method in write timings. More specifically, in the write back method, although the data is written into the local cache memory 6, it is not written into the external memory 4 at that instant. The data is written in the external memory 4 when the local cache memory 6 purges it. As a result, the low operation rate global bus 2 and interface 3 are used only in the purge, achieving an operation rate higher than that of the write through method.

3. Application of the Local Cache Memory 6 to a Multiprocessor.

When applied to a multiprocessor, the local cache memory 6 must operate in the write through mode, and have a "monitoring function" of the write content of the CPU, as well.

The reason for employing the write through mode (that is, the reason that the write back method cannot be used) is as follows. When the data is written to the address 0013 in the write back mode, it is not written into the external memory 4 until it is purged. Thus, another CPU, which tries to read the address 0013, will read the data of that address which is not yet updated before the purge.

On the other hand, even if the write through mode is applied, if another CPU has already held the content of the address 0013, that content is not updated. Accordingly, it is necessary for each of the local cache memories 6 to monitor the write operation of the other local cache memories, so that each of the local cache memories 6 invalidates the content of the write data address if it detects that content in its address information.

To maintain the identity of the data between the local cache memories or between the local cache memories and a shared memory, various methods have been proposed in the cache memory configuration of the multiprocessor. For example, Japanese patent application laid-open Nos. 2-22757/1990 and 4-175946/1992 employs a technique of invalidating data in the cache memories by dividing data into shared/unshared data and accessing different memories in response to the shared or unshared data, and by monitoring the write of the shared data in the method described above.

U.S. Pat. No. 4,939,641 discloses a method that possesses shared/unshared information in the cache memory, and carries out read and write of the cache using the write back method for the unshared data, and the write through method for the shared data. In summary, they employs a method with "write monitoring". There are countless such configurations comprising multiple processors and cache memories, and some of them assume the "write monitoring".

With the foregoing arrangements, the conventional multiprocessors have the following problems.

A first problem is a waste time due to the monitoring.

The monitoring carried out at every write operation hinders the CPU from using the local cache memory during the monitoring, resulting in the reduction in the operation rate of the CPU. For example, let us assume that a certain processing takes 1,000,000 times of read operations, one clock period per read operation, and 10,000 times of write operation, four clock periods per write operation (because the write operation is carried out in the write through mode, and hence it is assumed that the write operation is carried out through the bus), plus two clock periods for write monitoring per write operation. When the same processing is executed by five CPUs, the sum of the write operations by all the CPUs will be 5 CPUs×10,000=50,000 times, requiring 100,000 clock periods for the monitoring.

Since the time period required for the processing except for the monitoring is 1,000,000+10,000×4=1,040,000 clock periods, the total processing time is prolonged nearly 10% owing to the monitoring.

Under the same assumption, if 20,000 times of write operations are executed, the processing time except for the monitoring will be 1,080,000 clock periods, and thus the monitoring, which requires 200,000 clock periods, prolongs the total processing time by about 20%. In addition, if 10 CPUs execute 20,000 times of write operations, the monitoring requires 400,000 clock periods and prolongs the processing time nearly 40%. Thus, the monitoring time is generally proportional to the number of CPUs and cache memories and the number of write operations.

A second problem is the reduction in processing rate due to the unavailability of the write back cache.

Assuming that the foregoing processing is executed, and 50% of the write operations hits the cache memories, and these write operations each take one clock period, the processing time except for the monitoring time becomes 1,000,000×1 clock period+10,000×½×4 clock periods+10,000×½×1 clock period=1,025,000 clock periods, which is shortened by about 2% compared with the foregoing 1,040,000 clock periods. If the number of write operations doubles, it takes 1,050,000 clock periods which is shortened by about 3% as compared with the foregoing 1,080,000 periods. An increasing hit ratio will further reduce the write time to the write back cache. The multiprocessor, however, an use only the write through cache with a lower rate because the write back cache-impedes the CPU from reading the updated data.

A third problem relates to a cost.

When such a multiprocessor system with the write monitoring function is to be implemented in a single chip, the monitoring causes an increase in the function of the cache memory, which means that normal cache memories that are present in the library cannot be applied, or must be modified. If the revision is needed, this will increase the design period by that amount. In addition, a chip layout area will be increased by the additional function. As a result of the increase in the design time and layout area, an increase in the cost for developing and producing the chip is unavoidable.

On the other hand, when implementing the monitoring using components outside the chip will also present a problem. The write back or write through caches themselves are available at a rather low cost because they are widely employed by single processors which do not require any caches with write monitoring.

It is difficult, however, to acquire the cache memories with the "write monitoring" function at a low cost. This is because the multiprocessors are used only in special fields and offer only a small market, and therefore their components are limited in production and become expensive.

SUMMARY OF THE INVENTION

The present invention is implemented to solve the foregoing problems. It is therefore an object of the present invention to provide a multiprocessor capable of circumventing the write monitoring of the cache memories, reducing the load of its bus and data caches, and thus implementing high speed processing of the data caches.

According to a first aspect of the present invention, there is provided a multiprocessor system comprising: a plurality of processor units, each of which includes a CPU having a shared bus terminal and an unshared bus terminal, and a local cache memory connected to the unshared bus terminal of the CPU for storing unshared information used by the CPU of the same processor unit; a plurality of local shared buses, each of which connects, to a global bus, the shared bus terminal of the CPU of each of the plurality of processor units; a plurality of local unshared buses, each of which connects, to the global bus, a bus terminal of the local cache memory of each of the plurality of processor units; and an interface for connecting the global bus to an external memory that includes a shared area for storing shared information used in common by the CPUs of all of the plurality of processor units, and an unshared area for storing the unshared information.

Here, the global bus may comprise a global shared bus connected to the plurality of local shared buses, and a global unshared bus connected to the plurality of local unshared buses.

The interface may comprise a shared interface for connecting the global shared bus to an external shared memory for storing shared information used in common by the CPUs of all the plurality of processor units; and an unshared interface for connecting the global unshared bus to an external unshared memory for storing the unshared information, the external unshared memory being used-in common by the CPUs of all the plurality of processor units.

The multiprocessor system may further comprise a global shared cache memory interposed in the global bus at an inside of the interface.

The multiprocessor system may further comprise a global shared cache memory interposed in the global shared bus at an inside of the interface.

The multiprocessor system may further comprise a global shared cache memory interposed in the global shared bus at an inside of the shared interface.

The local cache memory may have a write through function.

The local cache memory may have a write back function.

Each of the plurality of processor units may further comprise at least one other cache memory for storing unshared information used by the CPU of the same processor unit, and the CPU may further comprise at least one other unshared bus terminal connected to the at least one other cache memory, wherein the multiprocessor system may further comprise at least one other global unshared bus; local unshared buses, each of which connects to the at least one other global unshared bus an unshared bus terminal of the at least one other cache memory of each of the plurality of processor units; and at least one other unshared interface for connecting the at least one other global unshared bus to at least one other external unshared memory for storing the unshared information, the at least one other external unshared memory being used in common by the CPUs of all the plurality of processor units.

The CPU of each of the plurality of processor units may further comprise an external device bus terminal, and the multiprocessor system may further comprise a global external device bus; local external device buses, each of which connects to the global device bus the external device bus terminal of the CPU of each of the plurality of processor units; and an external device interface for connecting the global external device bus to an external device.

Each of the plurality of processor units may further comprise a local memory connected to one of input side and output side of the local cache memory.

The CPU of the each of the plurality of processor units may comprise a CPU main unit including an address terminal, a data terminal and a control terminal; a shared/unshared decision circuit that receives address information from the address terminal, and makes a shared/unshared decision; and a shared/unshared bus selector that receives an output of the shared/unshared decision circuit, connects the terminals of the CPU main unit to the shared bus terminal when the shared/unshared decision circuit makes a shared decision, and connects the terminals of the CPU main unit to the unshared bus terminal when the shared/unshared decision circuit makes an unshared decision.

The shared/unshared decision circuit may comprise a RAM whose input is an upper part of the address information, and whose output indicates the shared/unshared decision of an address block associated with the upper part of the address information.

The shared/unshared decision circuit may make the shared/unshared decision for each segment in accordance with a shared/unshared bit retained in a pointer table of the CPU.

The CPU may determine a bus to be accessed by making the shared/unshared decision of data from segment information provided when making a memory access.

The CPU may select a bus by accessing shared/unshared data with different instructions based on user information.

Bus terminals of different types of the CPUs may be connected in common to the global unshared bus, the global shared bus and the global external device bus.

According to a second aspect of the present invention, there is provided a multiprocessor system comprising: a plurality of recursive processor units, each of which includes a plurality of processor units, wherein each of the plurality of processor units includes a CPU having a shared bus terminal and an unshared bus terminal, and a local cache memory connected to the unshared bus terminal of the CPU for storing unshared information used by the CPU of the same processor unit, and wherein each of the plurality of recursive processor units further includes an inclusive shared bus terminal to which shared bus terminals of the plurality of processor units are connected, and an inclusive unshared bus terminal to which unshared bus terminals of the plurality of processor units are connected; a plurality of local shared buses, each of which connects, to a global shared bus, the inclusive shared bus terminal of each of the plurality of recursive processor units; a plurality of local unshared buses, each of which connects, to a global unshared bus, the inclusive shared bus terminal of each of the plurality of recursive processor units; a shared interface for connecting the global shared bus to an external shared memory for storing shared information used in common by the CPUs of all the plurality of processor units; and an unshared interface for connecting the global unshared bus to an external unshared memory for storing the unshared information, the external unshared memory being used in common by the CPUs of all the plurality of processor units.

DETAILED DESCRIPTION OF THE PREFERRED EMBODIMENTS

The invention will now be described with reference to the accompanying drawings.

Embodiment 1

Figure 1:
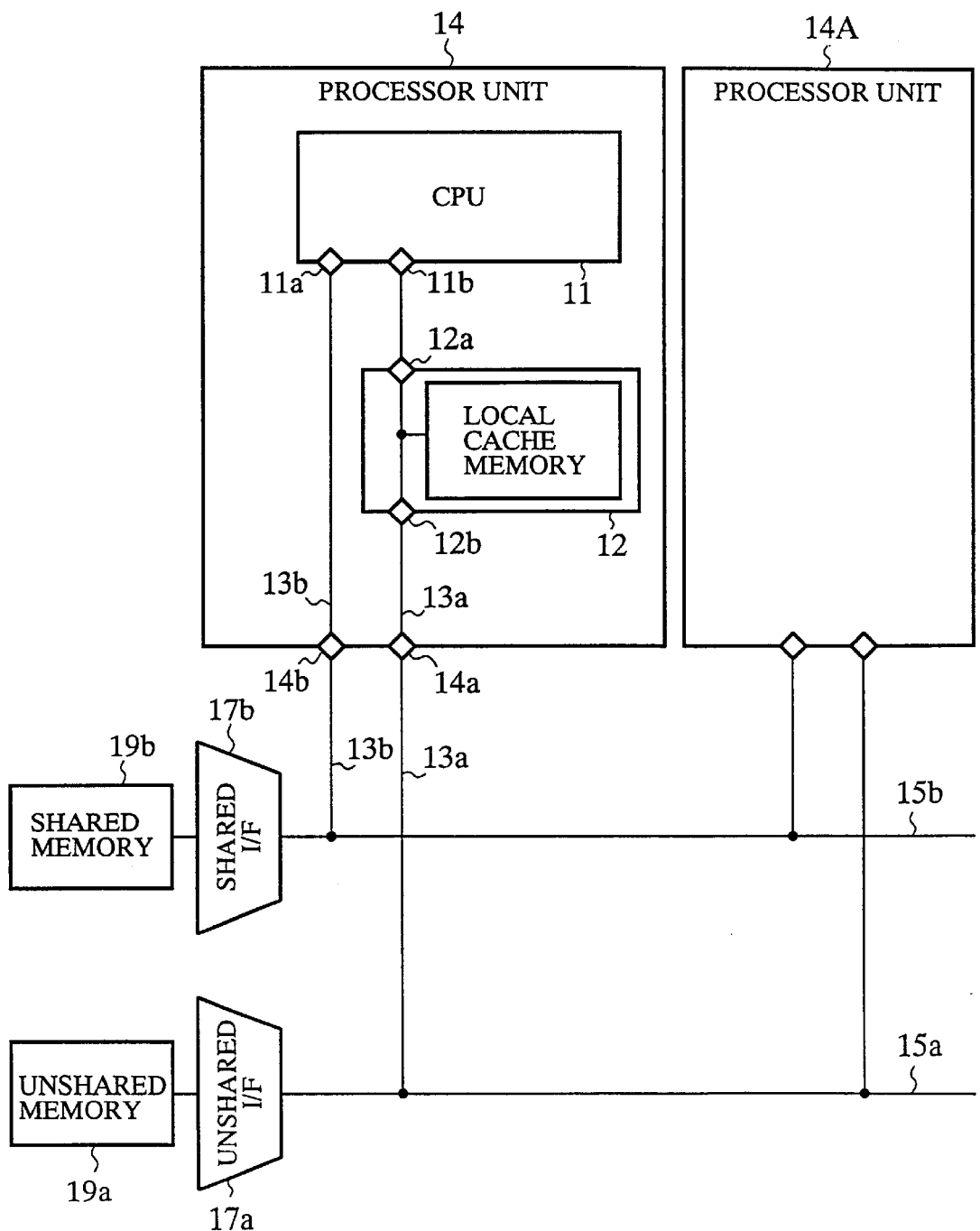
FIG. 1 is a block diagram showing a configuration of an embodiment 1 of a multiprocessor system in accordance with the present invention.

FIG. 1 is a block diagram showing a configuration of an embodiment 1 of a multiprocessor system in accordance with the present invention which employs write back caches without using any shared caches.

Here, the meaning of the terms "shared" and "unshared" in the present specification will be described. Data that are handled by CPUs are divided into "shared data" usable in common by a plurality of CPUs, and "unshared data" available only by a single CPU. Resources that transfer or store the shared data are referred to as "shared resources", which must be usable in common by a plurality of CPUs. On the other hand, resources that transfer or store the unshared data are referred to as "unshared resources", which includes not only "dedicated resources" used only by a single CPU, but also "common resources" used in common by the plurality of CPUs. In other words, those that handle the unshared data are called "unshared resources" regardless of whether they are common or dedicated. Thus, the common resources include all the shared resources and part of the unshared resources.

In FIG. 1, the reference numeral 11 designates an i-th CPU that makes a decision as to whether the data to be read or written is shared data or unshared data according to an instruction address or access address, and selects a bus in response to the decision result. The decision method will be described later in connection with an embodiment 10 and thereafter. The i-th CPU 11 includes an (i,1)-th shared bus terminal 11a and an (i,1)-th unshared bus terminal 11b, and selects one of them depending on whether the instruction or access relates to shared data or unshared data.

The reference numeral 12 designates an (i,1)-th local cache memory without a function of monitoring a write operation of the other CPUs. The (i,1)-th local cache memory 12 executes only the exchange of data because programs do not need to be rewritten in principle, and the instruction cache is omitted from FIG. 1 as mentioned before. The (i,1)-th local cache memory 12 includes an (i,1)-th CPU side bus terminal 12a and an (i,1)-th CPU external side bus terminal 12b. The (i,1)-th CPU side bus terminal 12a is connected to the (i,1)-th unshared bus terminal 11b. The (i,1)-th local cache memory 12 is a dedicated resource of the i-th CPU 11.

The reference numeral 13a -designates an (i,1)-th-local unshared bus connected to the (i,1)-th CPU external side bus terminal 12b of the (i,1)-th local cache memory 12, and 13b designates an (i,1)-th local shared bus connected to the (i,1)-th shared bus terminal 11a of the i-th CPU 11.

The reference numeral 14 designates an i-th processor unit that includes the i-th CPU 11, (i,1)-th local cache memory 12, (i,1)-th local unshared bus 13a and (i,1)-th local shared bus 13b.

The i-th processor unit 14 has its (i,1)-th unit unshared bus terminal 14a and (i,1)-th unit shared bus terminal 14b connected to the (i,1)-th local unshared bus 13a and (i,1)-th local shared bus 13b, respectively. The total number of the processor units is I. The reference numeral 14A designates an (i+1)-th processor unit that is adjacent to the i-th processor unit 14 and has the same structure as the i-th processor unit 14.

The reference numeral 15a designates a first global unshared bus connected to the (i,1)-th unit unshared bus terminal 14a of the i-th processor unit 14 for transferring the unshared data from the CPU to an external unshared memory 19a. Although not shown in this figure, the first global unshared bus 15a is equipped with a bus arbiter for arbitrating between access requests from the (i,1)-th unit unshared bus terminals 14a. This resource is common to all the CPUs (processor units).

The reference numeral 15b designates a first global shared bus connected to the (i,1)-th unit shared bus terminal 14b of the i-th processor unit 14 for transferring the shared data from the CPU to an external shared memory 19b. Although not shown in this figure, the first global shared bus 15b is equipped with a bus arbiter for arbitrating between access requests from the (i,1)-th unit shared bus terminals 14b. This resource is common to all the CPUs (processor units).

The reference numeral 17a designates a first unshared interface through which external unshared memory 19a or the like is accessed. This resource is common to all the CPUs (processor units).

The reference numeral 17b designates a first shared interface through which external shared memory 19b or the like is accessed. This resource is common to all the CPUs (processor units).

The unshared memory 19a is a memory for storing the unshared data. It may be common to all the processor units without being dedicated to one of the processor units. Write areas of the respective CPUs on the (common) unshared memory 19a can be divided in accordance with the address. For example, among the addresses 0000-7FFF assigned to the unshared memory 19a, the area 0000-0FFF is allocated to the first CPU, the area 1000-1FFF is allocated to the second CPU, and so on. Accordingly, the area 0000-0FFF of the unshared memory 19a is "dedicated" to the first CPU.

The reference numeral 19b designates a shared memory 19b for storing the shared data. The area of the shared memory 19b is provided so that it does not overlap with the area of the unshared memory 19a.

[Restriction on the Outside World of the Interface of the Present Configuration]

A bus configuration beyond the first unshared interface 17a and first shared interface 17b is not a subject matter of the present invention. Thus, such a configure is possible in which a particular memory block can be read only through the first unshared interface 17a, but another memory block can be read either through the first unshared interface 17a or the first shared interface 17b.

For convenience of explanation, it is assumed in the following description that the shared memory 19b and unshared memory 19a are arranged as shown in FIG. 1.

[Description of an Unshared Data Work Area]

The present invention implements a high speed and low cost system by circumventing the write monitoring by placing the contents that are used only in an instant processing, that is, the contents of a work area, only within the local cache memories, and by writing the contents that are used by the plurality of processor units into the single memory without placing them into the local cache. Here, let us take an example of obtaining average marks of five subjects by five CPUs.

The multiprocessor includes memory contents that must be shared and unshared in writing. For example, let us assume that five CPUs obtain the average marks of five subject, "English", "mathematics", "Japanese", "science" and "social studies".

In this case, a memory is required for storing the total mark and the number of samples of English. This memory, however, is not required for calculating the average mark of "mathematics". Such a storage area that is not required by the other processings is generally called work area. Since it is not necessary for the other CPUs to obtain the contents of the work area, they are stored in the (i,1)-th local cache memory 12.

This operation will now be described. When accessing the work area, the CPU decides that the access relates to the "unshared data", and carries out the access by selecting the (i,1)-th unshared bus terminal 11b of the CPU. According to the access information from the CPU 11, the (i,1)-th local cache memory 12 searches for the content of this address, and returns the content if it is found.

Otherwise, the (i,1)-th local cache memory 12 requires access to the unshared memory 19a through the (i,1)-th local unshared bus 13a, first global unshared bus 15a and first unshared interface 17a.

When the first global unshared bus 15a becomes available thanks to the arbitration, the (i,1)-th local cache memory 12 acquires the present address of the unshared memory 19a, and extracts a copy of the content of the address. In this case, since each unshared area of the unshared memory 19a is dedicated to one of the CPUs as described above, it is protected from any write operations by the other CPUs, and has nothing to do with the other CPUs.

While the (i,1)-th local cache memory 12 holds the content of the address after reading it, the i-th CPU 11 accesses only the (i,1)-th local cache memory 12. Since the other CPUs do not need to know the contents of the (i,1)-th local cache memory 12, they do not execute the write monitoring of the (i,1)-th local cache memory 12 even if its content is updated.

[Description of the Shared Data and Operations Associated with It]

After obtaining the average marks of the individual subjects, it is often required to calculate deviations to learn the degree of difficulty of the subjects. In this case, since the average marks of the subjects are necessary for obtaining the deviations, the average marks must be shared. These contents required by the other CPUs (processings) are not stored in the (i,1)-th local cache memory 12, but stored in the shared memory 19b through the (i,1)-th local shared bus 13b, first global shared bus 15b and first shared interface 17b.

This operation will now be described. Deciding as the shared data, the i-th CPU 11 selects the (i,1)-th shared bus terminal 11a, and issues an access request to the shared memory 19b through the (i,1)-th local shared bus 13b, first global shared bus 15b and first shared interface 17b. When the first global shared bus 15b becomes available thanks to the arbitration, the i-th CPU 11 acquires the instant address of the shared memory 19b.

Even if this operation is a write one, no write monitoring is required. The reason for this will be described. When the i-th CPU 11 completes the write operation, the shared memory 19b stores the latest write information. This ensures that another CPU, which accesses the same address of the shared memory 19b to read its content immediately after that, obtains the latest content because the shared memory 19b retains it. In addition, no local cache memories are used for obtaining the shared data therefrom. Therefore, the write monitoring which has been a tacit understanding with the parallel processing can be circumvented.

[First Advantages of Dividing the Shared and Unshared Data, and of Not Storing the Shared Data in the Cache Memory]

In this case, not the write through cache but the write back cache can be used as the (i,1)-th local cache memory 12, because the other CPUs do not need to learn that the content of the work area is updated every time it is rewritten. In other words, the contents of the work area are closed within the (i,1)-th local cache memory 12. Normally, much greater number of accesses are carried out to the work area.

Incidentally, such contents as constants that are never rewritten from the beginning to the end can also be stored in the (i,1)-th local cache memory 12 to be read therefrom, because they are invariable and have nothing to do with the other processings.

[Second Advantages of Dividing the Shared and Unshared Data, and of Not Storing the Shared Data in the Cache Memory]

It is now recognized that the write back cache without the monitoring function is applicable to the (i,1)-th local cache memory 12 by separating the shared contents from the unshared. Here, let us estimate the processing time under the assumption that read operations occur 1,000,000 times, 5,000 times of which is carried out through the shared bus; write operations occur 10,000 times, 5,000 times of which is carried out through the shared bus; each read or write operation through the local cache is carried out using the write back cache, and requires one clock period; and each read or write operation through the shared bus requires four clock periods. In this case, the processing time is estimated as $(995,000+5,000) \times 1 + (5,000+5,000) \times 4 = 1,040,000$ clock periods, which is improved by about 10% as compared with that of the conventional system that requires 1,140,000 clock periods.

In addition, although the conventional system can apply only the write through cache, the present embodiment 1 can employ either the write back cache or write through cache as the local cache (although the write back cache performs better, the write through cache can also be used for some design reasons).

[Third Advantages of Dividing the Shared and Unshared Data, and of Not Storing the Shared Data in the Cache Memory]

As described above, the (i,1)-th local cache memory 12 can circumvent the special write monitoring associated with the multiprocessor. This means that general purpose cache memories can be used instead of the expensive cache memories dedicated to the multiprocessors, making it possible to reduce the cost.

Embodiment 2

The present embodiment 2 relates to a case that employs the write back caches in combination with a shared cache memory.

Figure 2:
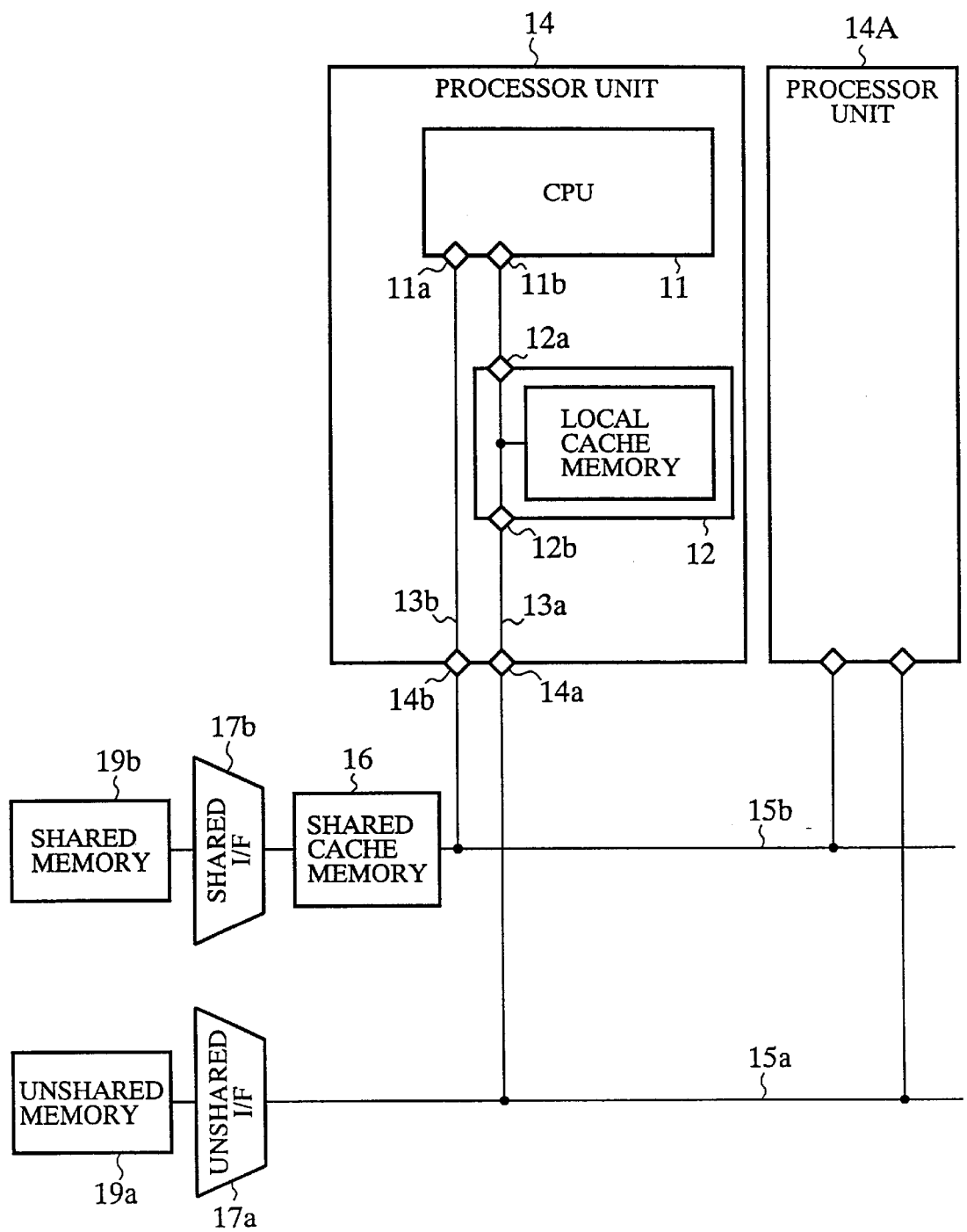
FIG. 2 is a block diagram showing a configuration of an embodiment 2 of the multiprocessor system in accordance with the present invention.

FIG. 2 is a block diagram showing a configuration of the embodiment 2 of the multiprocessor system in accordance with the present invention. In this figure, corresponding portions to those of the foregoing embodiment 1 as shown FIG. 1 are designated by the same reference numerals and the description thereof is omitted here.

The present embodiment 2 comprises a first global shared cache memory 16 which is interposed into the first global shared bus 15b on the inside of the first shared interface 17b.

With this configuration, when the (i+1)-th CPU 14A tries, immediately after the i-th CPU 11 has written into a particular address of the first global shared cache memory 16, to read the particular address, it can read the latest content because it reads that content the first global shared cache memory 16 updated immediately before. In addition, further speedup of the processing is implemented by installing the first global shared cache memory 16.

Let us estimate the processing time in the same S processing conditions as those of the embodiment 1 under the assumption that the read or write operation of the shared data requires two clock periods owing to providing the first global shared cache memory 16. It becomes $(995,000+5,000) \times 1 + (5,000+5,000) \times 2 = 1,020,000$, which is slightly improved as compared with that of the embodiment 1. This example, however, includes only a small number of read/write operations of shared data, and the present embodiment 2 will become more effective as the number of the read/write operations increases.

Embodiment 3

The present embodiment 3 relates to a case that employs the write back caches in combination with a single interface.

Figure 3:
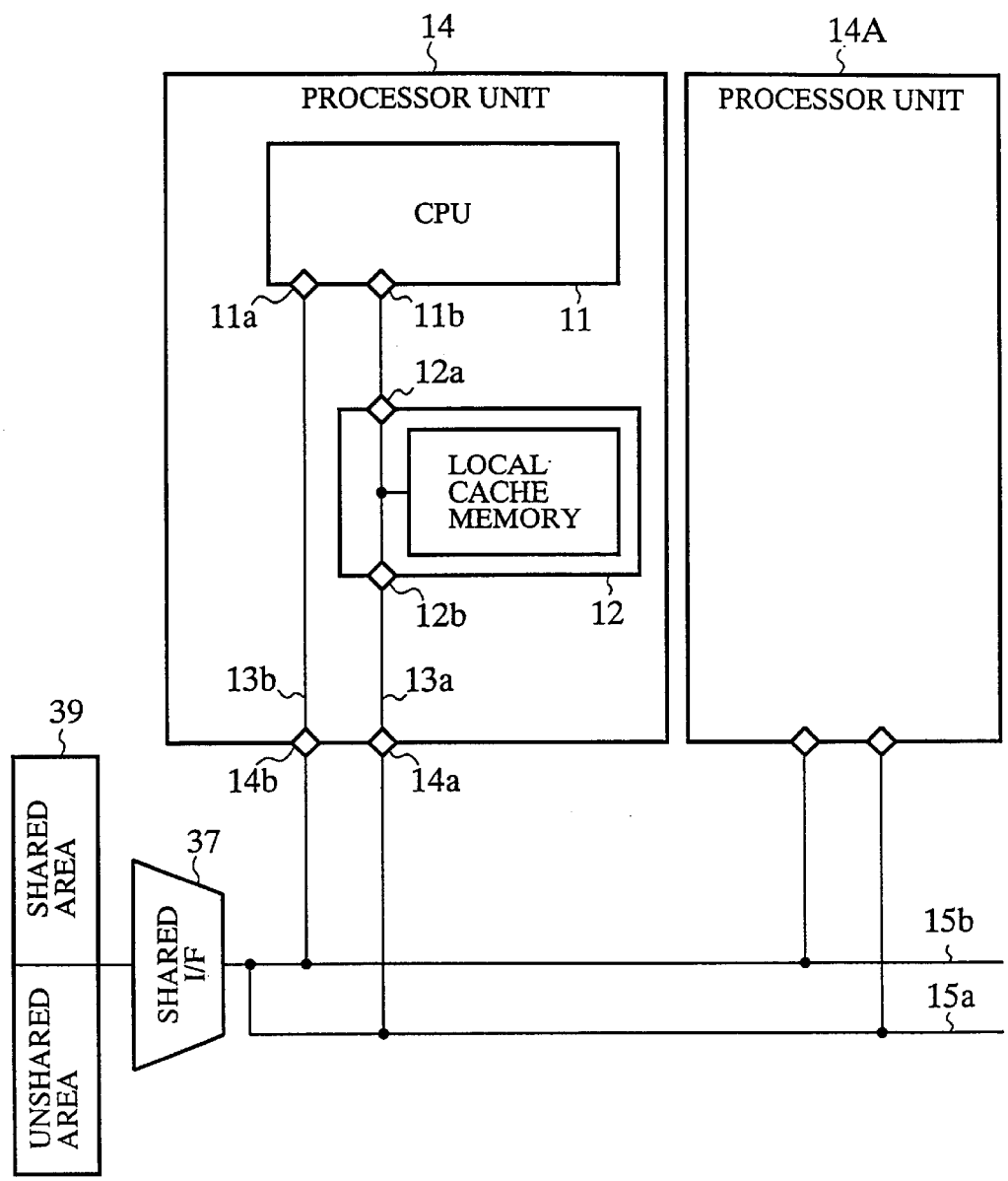
FIG. 3, is a block diagram showing a configuration of an embodiment 3 of the multiprocessor system in accordance with the present invention.

FIG. 3 is a block diagram showing a configuration of the embodiment 3 of the multiprocessor system in accordance with the present invention. In this figure, corresponding portions to those of the foregoing embodiment 1 as shown FIG. 1 are designated by the same reference numerals and the description thereof is omitted here.

The present embodiment 3 has a configuration in which a shared/unshared memory 39 is connected to the first global unshared bus 15a and first global shared bus 15b through a shared interface 37. The shared/unshared memory 39 includes a shared area and an unshared area, which do not overlap on each other.

Next, the operation of the present embodiment 3 will be described.

When accessing the unshared data, the i-th CPU 11 issues an access request to the (i,1)-th local cache memory 12 through the (i,1)-th unshared bus terminal 11b. The (i,1)-th local cache memory 12 searches itself for the data, and if fails to find the data, it accesses a part of the unshared area of the shared/unshared memory 39, which is dedicated to the i-th CPU 11, through the first global unshared bus 15a and shared interface 37. The other CPUs are prevented from writing into that part of the unshared area dedicated to the i-th CPU 11, and the i-th CPU 11 itself cannot write into the corresponding areas of the other CPUS. In addition, since the part of the unshared area dedicated to the i-th CPU 11 is protected from writing the share data, the data written by the i-th CPU 11 is fully guaranteed. Thus, it is obvious that the write monitoring is unnecessary.

On the other hand, when accessing the shared data, the i-th CPU 11 accesses the part of the shared area of the shared/unshared memory 39, which is assigned to the i-th CPU 11, through the (i,1)-th shared bus terminal 11a, first global shared bus 15b and shared interface 37. When the shared data is written, it immediately becomes effective for the read operations of the other CPUs, thereby circumventing the write monitoring.

In the present embodiment 3, the shared interface 37 passes both the shared data and unshared data. This method, however, is effective when the hit ratio to the (i,1)-th local cache memory 12 is high, and the number of read/write operations of the shared data is small.

Figure 4:
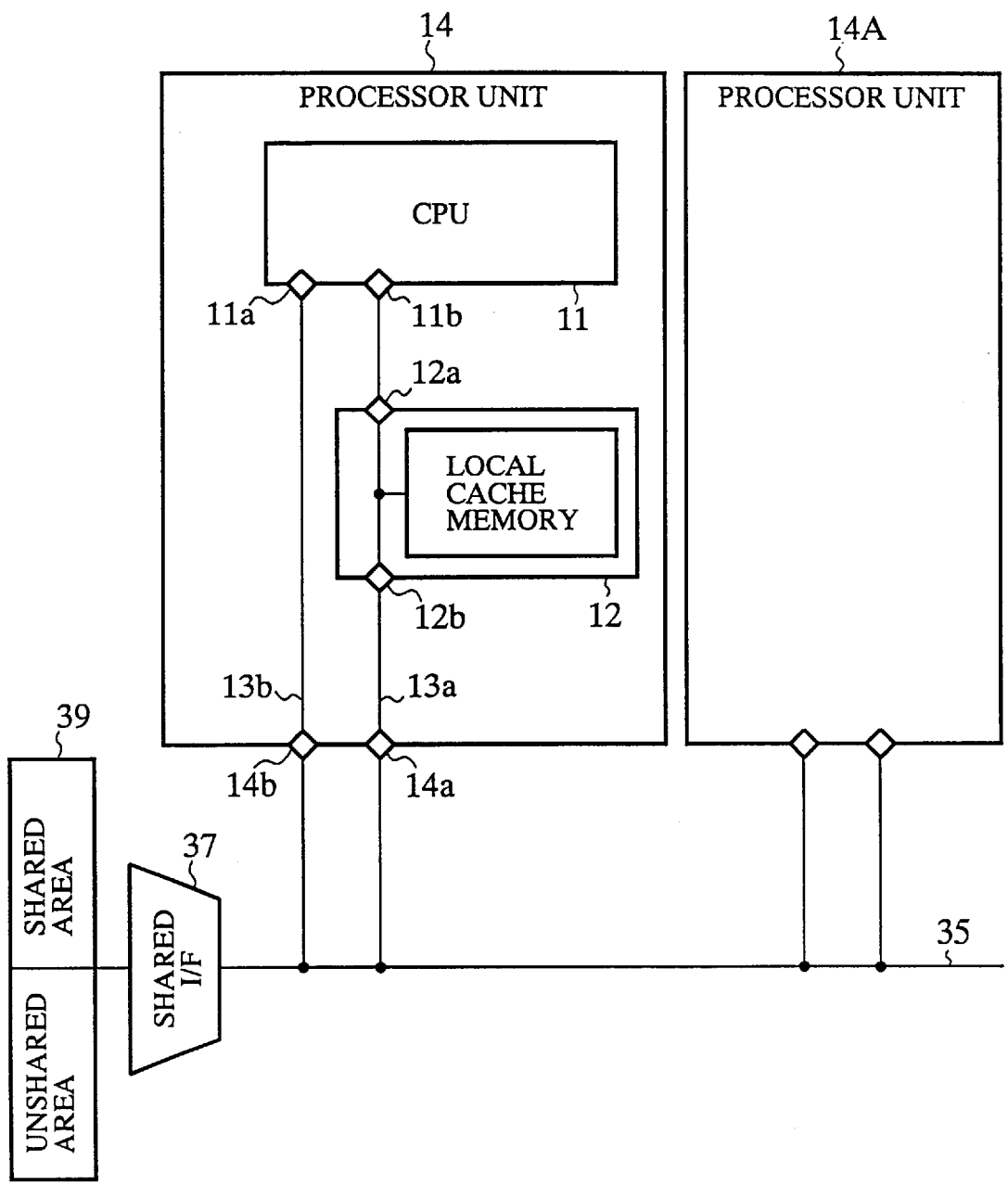
FIG. 4 is a block diagram showing another configuration of the embodiment 3 of the multiprocessor system in accordance with the present invention.

To install the multiprocessor system into a chip, it must be designed as small as possible. When two buses cannot be provided to implement a required area, the first global unshared bus 15a and first global shared bus 15b can be combined into a single first global bus 35 as shown in FIG. 4. Although the present embodiment 3 achieves about the same effect as the embodiment 2 does, its processing speed is slightly reduced because of the higher availability of the bus.

Embodiment 4

The present embodiment 4 relates to a case that employs the write back caches in combination with a single interface and a shared cache memory.

Figure 5:
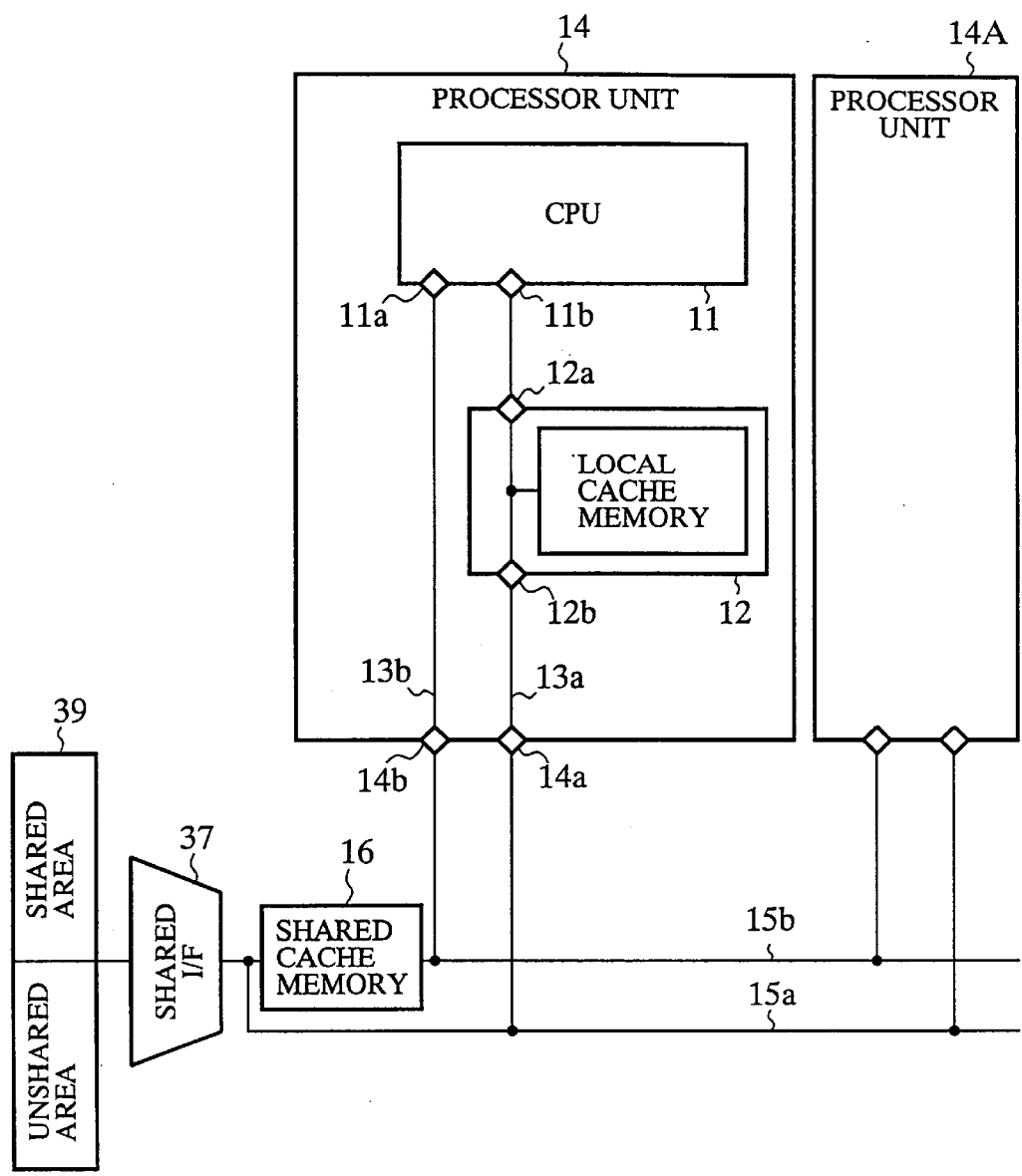
FIG. 5 is a block diagram showing a configuration of an embodiment 4 of the multiprocessor system in accordance with the present invention.

FIG. 5 is a block diagram showing a configuration of the embodiment 4 of the multiprocessor system in accordance with the present invention. In this figure, corresponding portions to those of the foregoing embodiment 3 as shown FIG. 3 are designated by the same reference numerals and the description thereof is omitted here. The present embodiment 4 comprises the first global shared cache memory 16 which is interposed into first global shared bus 15b on the inside of the shared interface 37.

This configuration is effective when the hit ratio to the (i,1)-th local cache memory 12 is high (that is, when the bus availability is low), and the number of read/write operations of the shared data is large. In such a case, this configuration can be employed to reduce the area occupied by the entire system. Although the present embodiment 4 achieves about the same effect as the embodiment 2 does, its processing speed is slightly reduced because of the higher availability of the bus.

Figure 6:
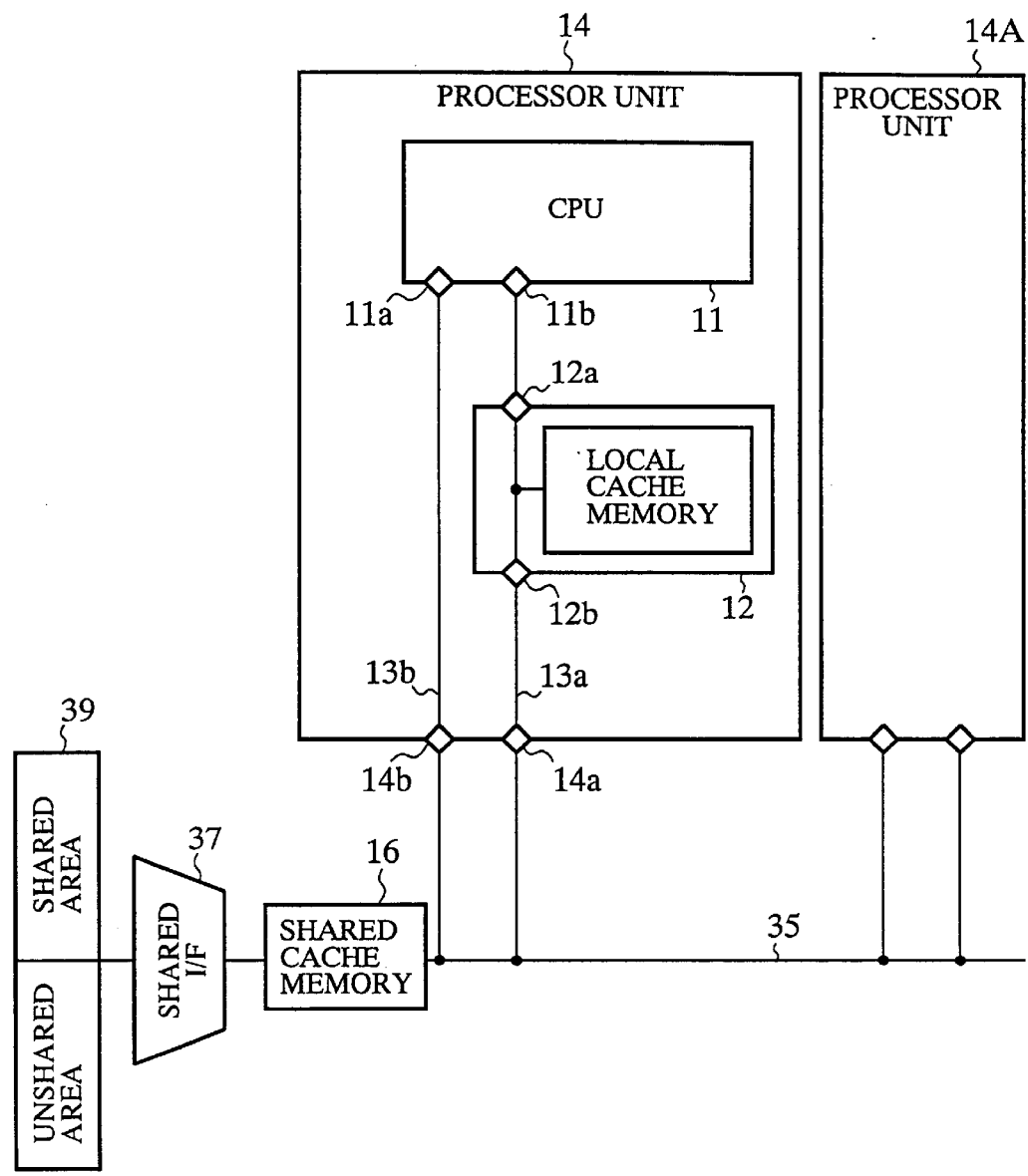
FIG. 6 is a block diagram showing another configuration of the embodiment 4 of the multiprocessor system in accordance with the present invention.

Alternatively, the first global unshared bus 15a and first global shared bus 15b can be combined into the single first global bus 35 as shown in FIG. 6. In this case, it is preferable that the first global shared cache memory 16 which is interposed into the first global bus 35 have as large a capacity as possible because it stores the unshared data, as well. Since the present embodiment 4 is based on the same principle as the embodiment 3, it can completely circumvent the write monitoring.

Embodiment 5

The present embodiment 5 takes a recursive configuration.

Figure 7:
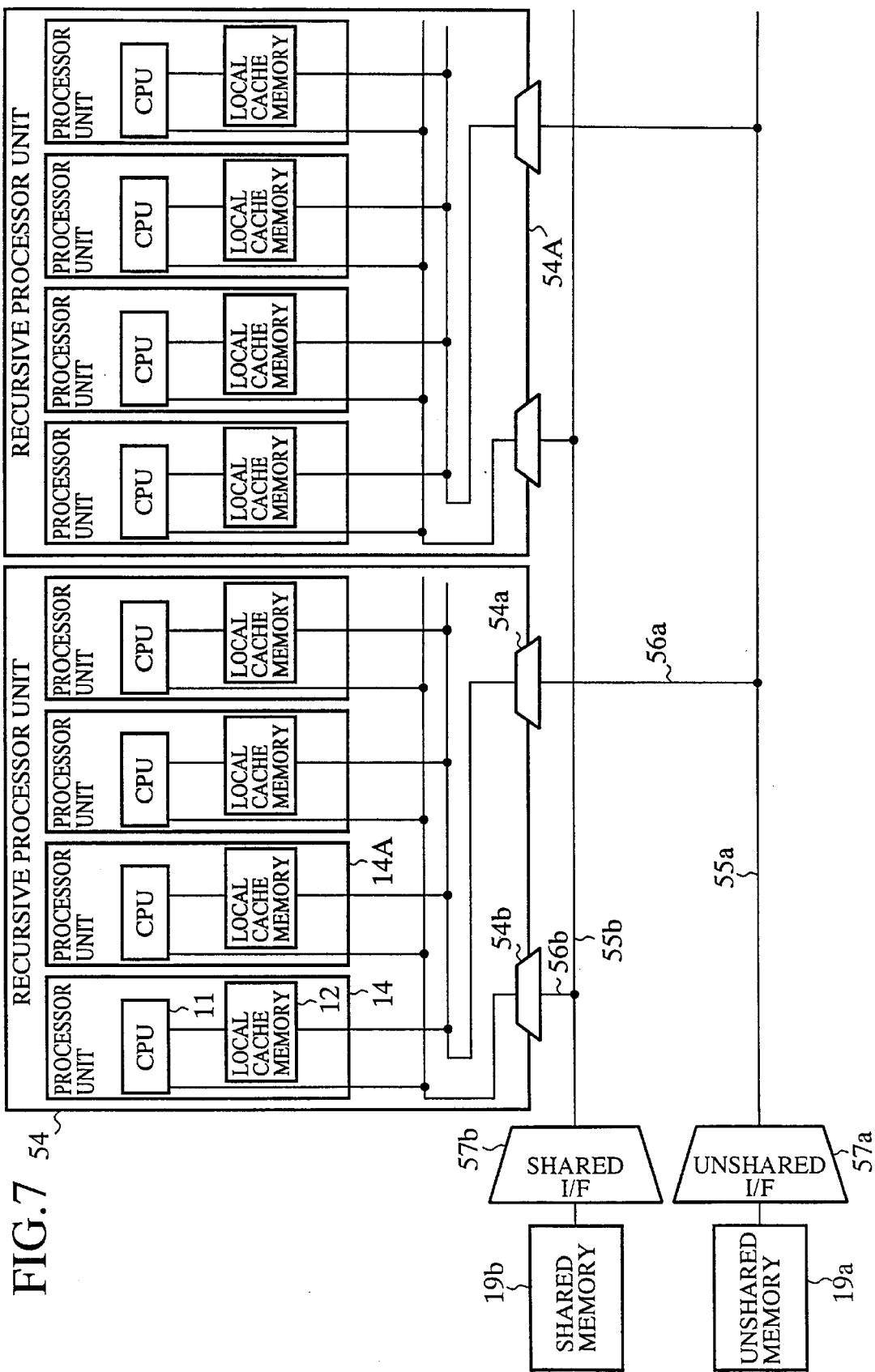
FIG. 7 is a block diagram showing a configuration of an embodiment 5 of the multiprocessor system in accordance with the present invention.

FIG. 7 is a block diagram showing an embodiment 5 of the multiprocessor system in accordance with the present invention, in which a plurality of processor units 14, 14A, . . . as shown in FIG. 1 constitute each of recursive processor units 54 and 54A. The reference numeral 54a designates a first (recursive) unit unshared bus terminal which is equivalent to the (i,1)-th unit unshared bus terminal 14a, and 54b designates a first (recursive) unit shared bus terminal which is equivalent to the (i,1)-th unit shared bus terminal 14b.

The reference numeral 55a designates a first (recursive) global unshared bus which is equivalent to the first global unshared bus 15a, and 55b designates a first (recursive) global shared bus which is equivalent to the first global shared bus 15b.

The reference numeral 57a designates a first (recursive) unshared interface which is equivalent to the first unshared interface 17a, and 57b designates a first (recursive) shared interface which is equivalent to the first shared interface 17b.

As clearly seen from FIG. 7, the structure of the recursive processor unit 54 is a recursion of the i-th processor unit 14 in the embodiment 1. As a result, applying the recursive processor unit 54 as a single processor unit enables double, triple recursion. In addition, although the recursive processor unit 54 is based on the embodiment 1 in FIG. 1, it may be based on the embodiment 2. Thus, the recursive structure can implement various configurations in accordance with their purposes.

Embodiment 6

The present embodiment 6 employs multiple buses as the unshared bus.

Figure 8:
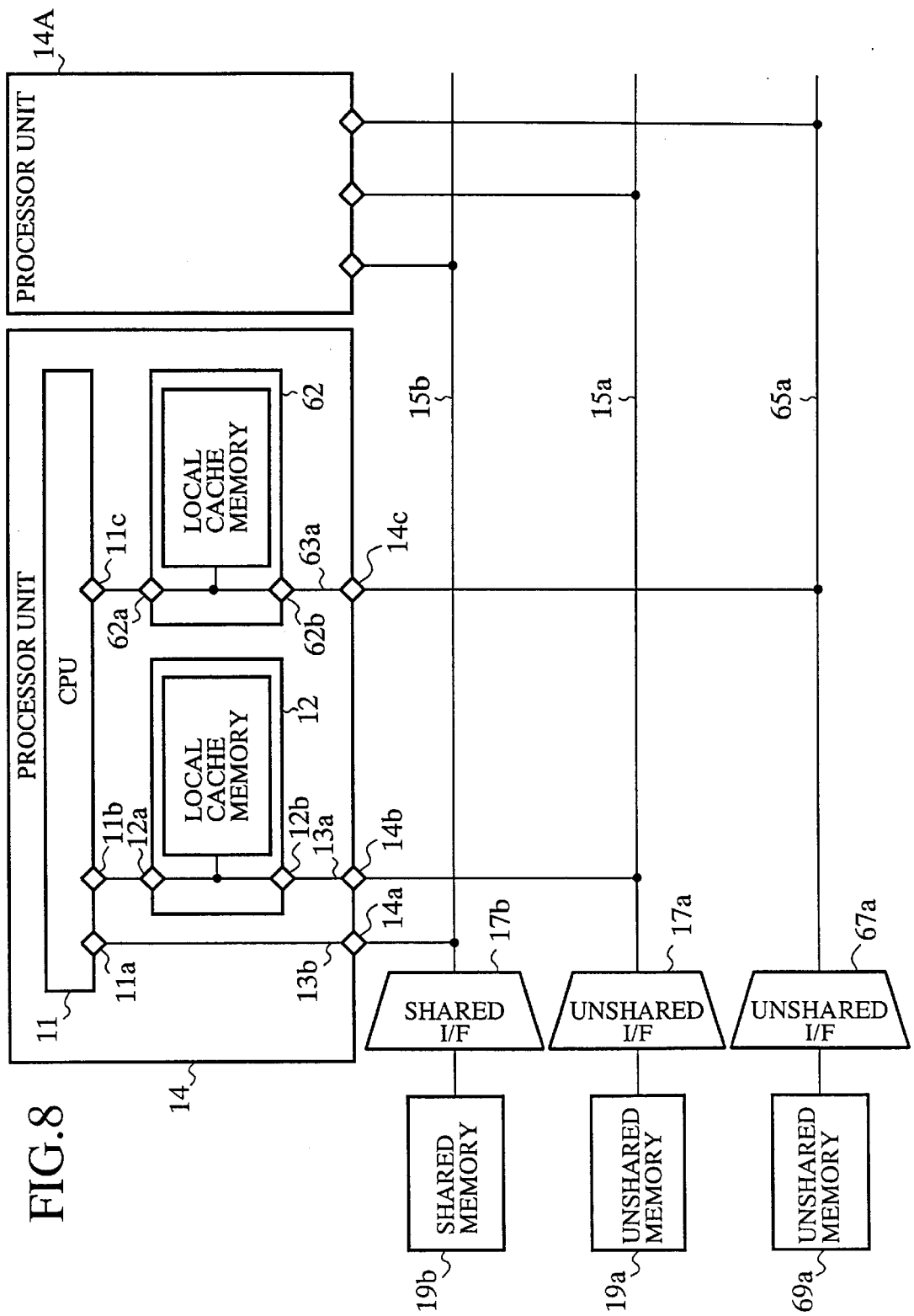
FIG. 8 is a block diagram showing a configuration of an embodiment 6 of the multiprocessor system in accordance with the present invention.

FIG. 8 is a block diagram showing the present embodiment 6 of the multiprocessor system in accordance with the present invention, in which corresponding portions to those of FIG. 1 of the embodiment 1 are designated by the same reference numerals and the description thereof is omitted here. Although the present embodiment 6 is described about a configuration based on the embodiment 1, similar configurations based on the other embodiments 2–4 are also possible, though their description is omitted here.

The i-th CPU 11 comprises two CPU unshared bus terminals 11b and 11c: The original (i,1)-th unshared bus terminal 11b and an additional (i,2)-th CPU unshared bus terminal 11c. The reference numeral 62 designates an (i,2)-th local cache memory that is connected to the (i,2)th CPU unshared bus terminal 11c and has the same function as the (i,1)-th local cache memory 12. The (i,2)-th local cache memory 62 includes an (i,2)-th CPU side bus terminal 62a and an (i,2)-th bus side bus terminal 62b. The (i,2)th CPU side bus terminal 62a is connected to the additional (i,2)-th CPU unshared bus terminal 11c of the i-th CPU 11. The reference numeral 63a designates an (i,2)-th local unshared bus that is connected to the (i,2)-th bus side bus terminal 62b of the additional (i,2)-th local cache memory 62.

The i-th processor unit 14 has an additional (i,2)-th unit unshared bus terminal 14c connected to the (i,2)-th local unshared bus 63a. The reference numeral 65a designates a second global unshared bus, 67a designates an additional second unshared interface, and 69a designates a second unshared memory connected to the second unshared interface 67a.

Although not shown in this figure, the unshared memory 19a and second unshared memory 69a are made accessible through the first unshared interface 17a or the second unshared interface 67a as a memory for storing the unshared data. The global interfaces can be connected with other equipment.

Next, the operation of the present embodiment 6 will be described.

The purge is apt to take place when the cache memory can store two pieces of address information, and reads three or more addresses. Once the purge occurs, it increases the availability of the first global unshared bus 15a, resulting in congestion. Here, the congestion means that the i-th CPU 11 cannot use the first global unshared bus 15a because another CPU occupies it, and hence must wait until it becomes available (the processing performance of the CPU decreases because it must wait in this state).

When the purge and bus congestion take place owing to frequent use of the unshared data addresses and to a small capacity of the (i,1)-th local cache memory 12, the bus load can be reduced by adding the second global unshared bus 65a as in the present embodiment 6.

The i-th CPU 11 selects one of the original and additional bus when accessing the unshared data. A simplest method of the selection is to alternate between the buses depending on whether the address is even or odd. If the i-th CPU 11 selects the additional (i,2)-th unshared bus terminal lic, it accesses the second unshared memory 69a through the (i,2)-th local cache memory 62 and second unshared interface 67a.

In this case, a path for another CPU like the (i+1)-th CPU to reach the unshared memory 19a through the first global unshared bus 15a and first unshared interface 17a is available. As a result, that another CPU can use the bus.

In the present embodiment 6, although depending on the bus timing, two CPUs can access the unshared data memories in general. This makes it possible to reduce the wait time and bus congestion, increasing the processing speed. Although the single global unshared bus is added in this example, an increasing number of buses can further reduce the congestion. It is preferable that such a configuration be implemented in one chip rather than in multiple chips. This is because the number of input/output terminals (pins) of a chip is about 300 at most in the state of the art technique, and hence the number of buses cannot be increased unlimitedly.

Generally speaking, it is ineffective to increase the buses beyond the number of the processor units (CPUs). For example, 100 buses for 10 CPUs will be nonsense because the number of buses used at once does not exceed the number of CPUs (ten), with the remaining 90 CPUs unused. Usually, the optimum number of buses is expressed as follows.

The number of global buses=the number of CPUs×(the average number of accesses to the unshared data per unit time×access time per unit time)

Embodiment 7

The present embodiment 7 relates to a system that comprises multiple shared buses.

Although not shown, by applying the idea of the foregoing embodiment 6 as shown in FIG. 8, the number of global shared buses can also be increased to implement multiple bus configuration, in which case advantages as described in the embodiment 6 can be obtained.

Embodiment 8

The present embodiment 8 relates to a system comprising an external I/O bus for a low speed peripheral device.

Figure 9:
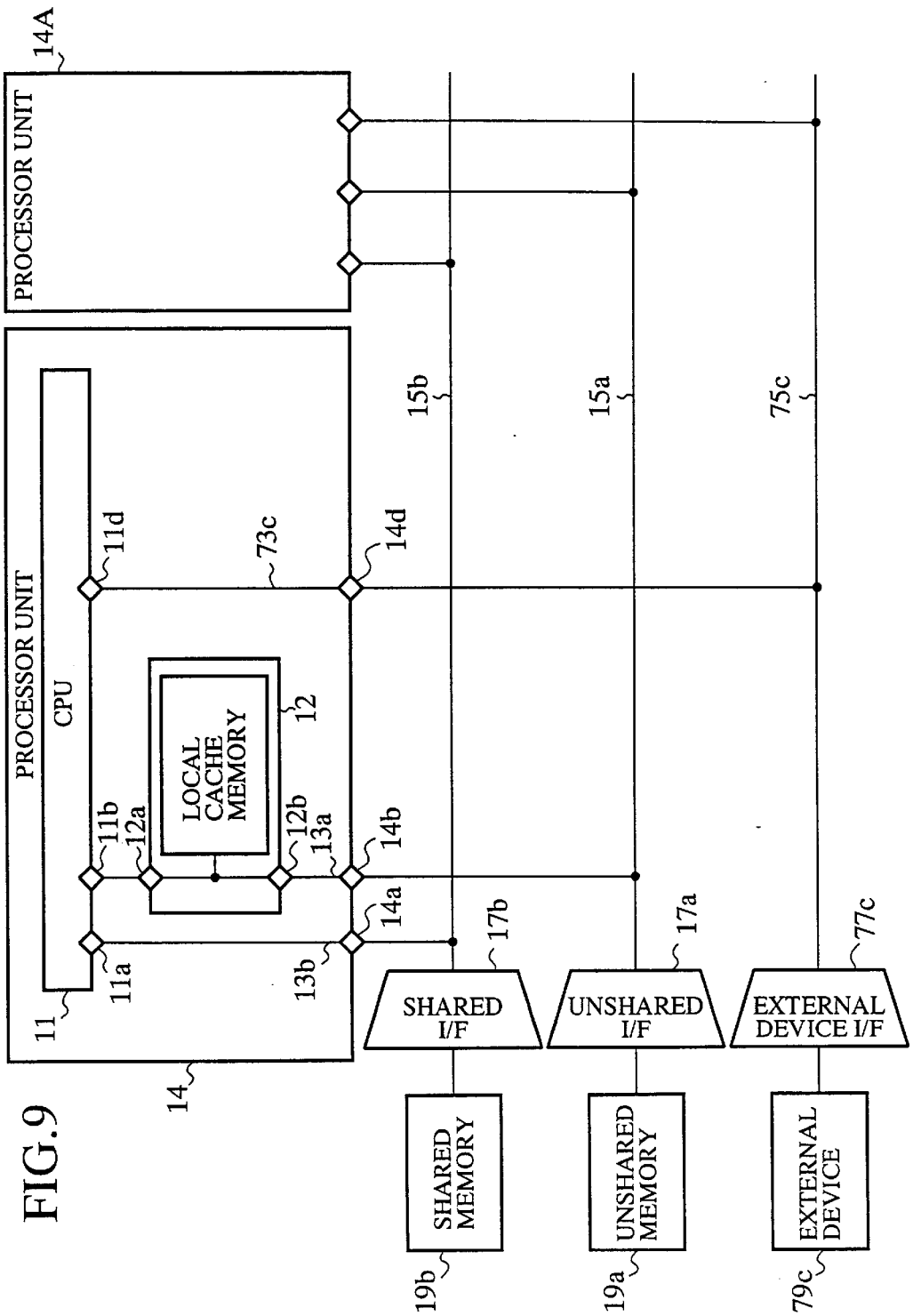
FIG. 9 is a block diagram showing a configuration of an embodiment 8 of the multiprocessor system in accordance with the present invention.

FIG. 9 is a block diagram showing the present embodiment 8 of the multiprocessor system in accordance with the present invention, in which the corresponding portions to those of the foregoing embodiment 1 as shown in FIG. 1 are designated by the same reference numerals, and the description thereof is omitted here.

In FIG. 9, the reference numeral 11 designates an i-th CPU that includes an (i,1)-th CPU external device bus terminal lid; and 73c designates an (i,1)-th local external device bus connected to the (i,1)-th CPU external device bus terminal 11d. The reference numeral 14 designates an i-th processor unit that includes an additional (i,1)-th unit external device bus terminal 14d connected to the (i,1)-th local external device bus 73c. The reference numeral 75c designates a first global external device bus connected to the (i,1)-th unit external device bus terminal 14d of each i-th processor unit 14. The reference numeral 77c designates a first external device interface; and 79c designates an external device that requires a very long access time.

Explanation of Bus Halt

The present embodiment 8 can avoid a bus halt due to the access to the low speed external device 79c. Here, the bus halt will be described. Assume that the system as the foregoing embodiment 1 includes a low speed external device 19b outside the first shared interface 17b, and its access time is 10,000 clock periods. If the first CPU accesses the low speed external device 19b, the remaining CPUs cannot use the first global shared bus 15b until the first CPU completes this access.

Thus, other CPUs that access the first global shared bus 15b must wait until the end of the access of the first CPU for 10,000 clock periods in the worst case. This means that any other devices are halted until the completion of the access, and thus the bus halt occurs. Let us assume in a worst case that there are 10 CPUs and each CPU makes one access to the external device per 1,000,000 clock periods. The access time for the external device is 10,000 clock periods×1 (time)×10 (CPUs)=100,000 clock periods, which means that bus halt occupies about 10% of the operation time. As a result, all the CPUs each have a speed reduction at a maximum of about 10%. To circumvent such a bus halt, the present embodiment 8 comprises the additional bus for the external device.

Next, the operation of the present embodiment 8 will be described.

The i-th CPU 11 makes a decision from the address information of an access (or from the instruction) at to whether the address is one assigned to the external device 79c. If the i-th CPU 11 decides that the address is assigned to the external device 79c, it accesses the external device 79c through the (i,1)-th CPU external device bus terminal 11d, (i,1)-th unit external device bus terminal 14d added to the i-th processor unit 14, first global external device bus 75c and first external device interface 77c without using the first global shared bus 15b and first global unshared bus 15a at all.

Thus, other CPUs that access the shared/unshared data can continue their processings without suffering from the reduction in speed due to the bus halt. Although the present embodiment 8 is described in connection with the embodiment 1, its idea is applicable not only to embodiments 2–4, but also to the recursive configuration as in the embodiment 5, and the multi-bus configuration as in the embodiments 6 and 7.

Embodiment 9

The present embodiment 9 relates to a system that stores the unshared data in a local memory.

Figure 10:
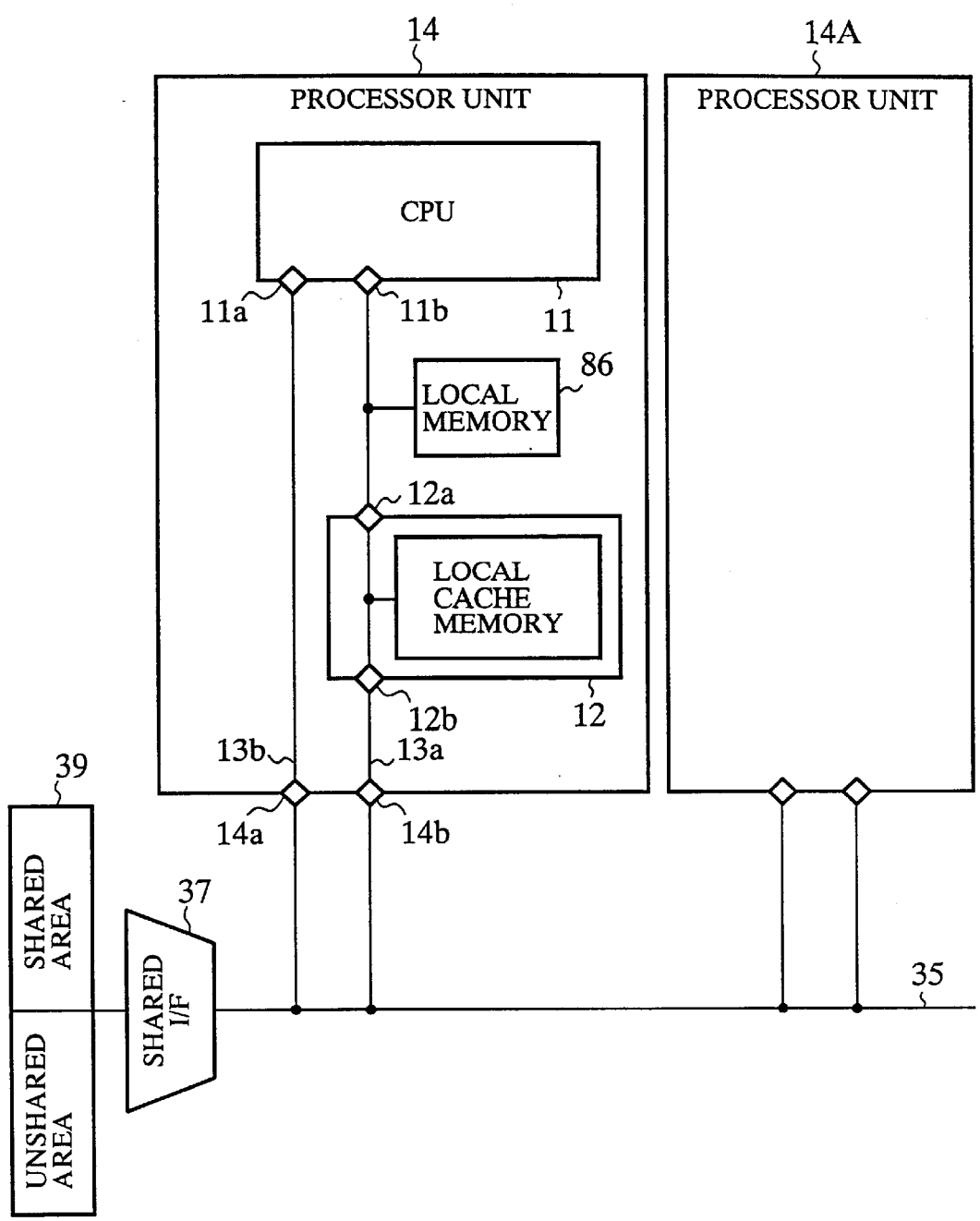
FIG. 10 is a block diagram showing a configuration of an embodiment 9 of the multiprocessor system in accordance with the present invention.

FIG. 10 is a block diagram showing a configuration of the present embodiment 9 of the multiprocessor system in accordance with the present invention, in which the corresponding portions to those of the embodiment 1 as shown in FIG. 1 are designated by the same reference numerals and the description thereof is omitted here.

Here, it is assumed that the unshared data, the work area in particular, is allocated to a predetermined area. When the CPU accesses the work area, it accesses an (i,1)-th local memory 86 in accordance with the address information. The (i,1)-th local memory 86 is dedicated to the i-th CPU 11. Since the work area itself is closed within this processing (CPU), it must not be connected to the outside. This means that it is unnecessary to use the first global bus 35. As a result, the bus availability is reduced very much.

Figure 11:
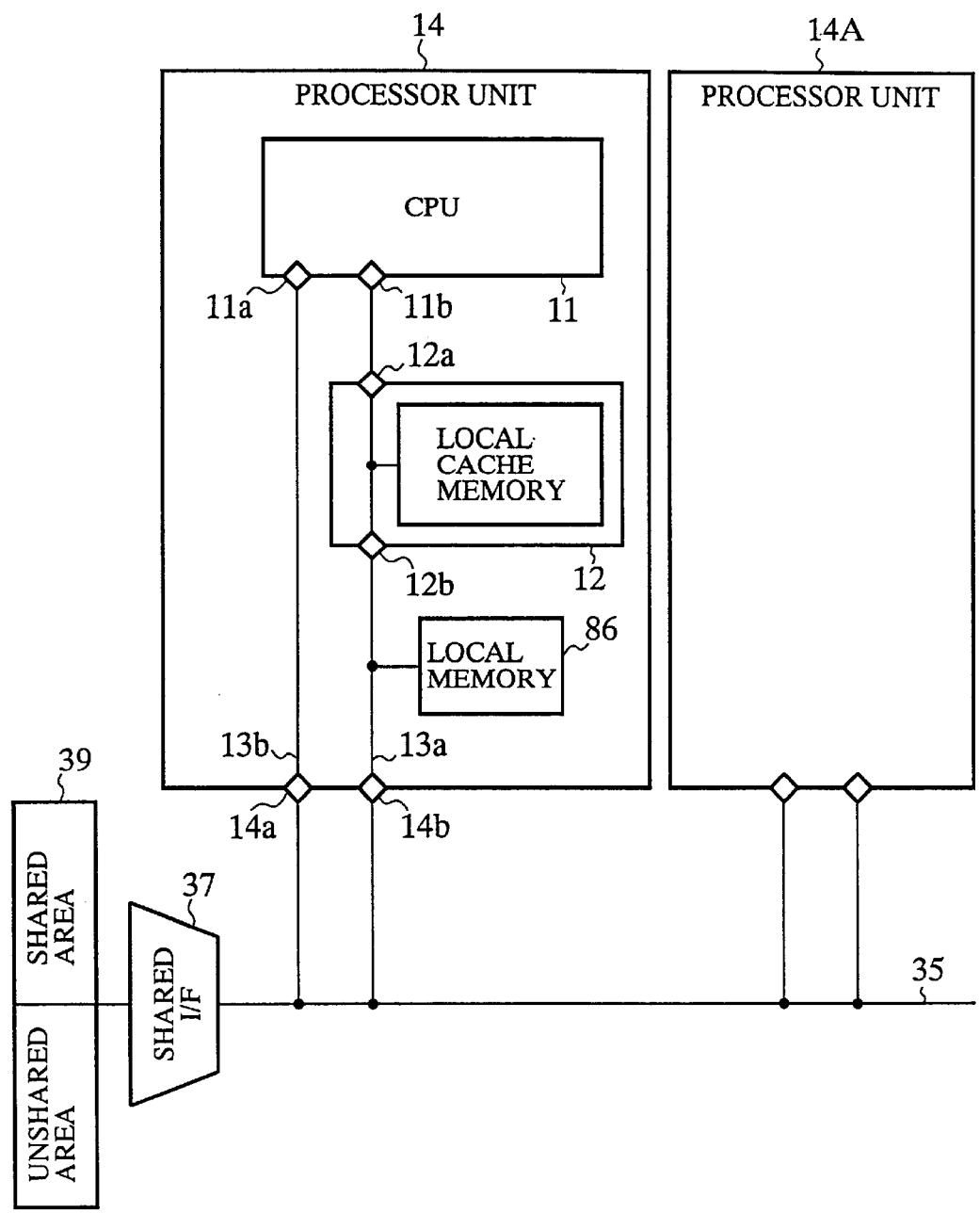
FIG. 11 is a block diagram showing another configuration of the embodiment 9 of the multiprocessor system in accordance with the present invention.

When the local memory 86 for the work area is small in capacity, a memory added to the first global bus can be employed as the work area. Furthermore, if the local memory 86 is slow, it can be accessed through the (i,1)-th local cache memory 12 as shown in FIG. 11. In either case, it is expected that the present embodiment 9 can increase its speed because of the reduction in the bus availability. The reduction in the bus availability is advantageous to implementing the embodiment 3 or 4, which leads to a reduction in space. In view of this, FIGS. 10 and 11 are based on the embodiment 3, in which case the configurations become very simple.

Embodiment 10

The present embodiment 10 relates to a first shared/unshared decision method—a first decision method according to address.

Although the embodiments so far are described on the premise that the CPU can make a decision as to the shared/unshared, the embodiments from now on will discuss issues of which types of CPUs are appropriate, and which types of peripheral circuits are suitable to be connected to the CPUs in configuring the foregoing embodiments, even though they may be common CPUs.

Figure 12:
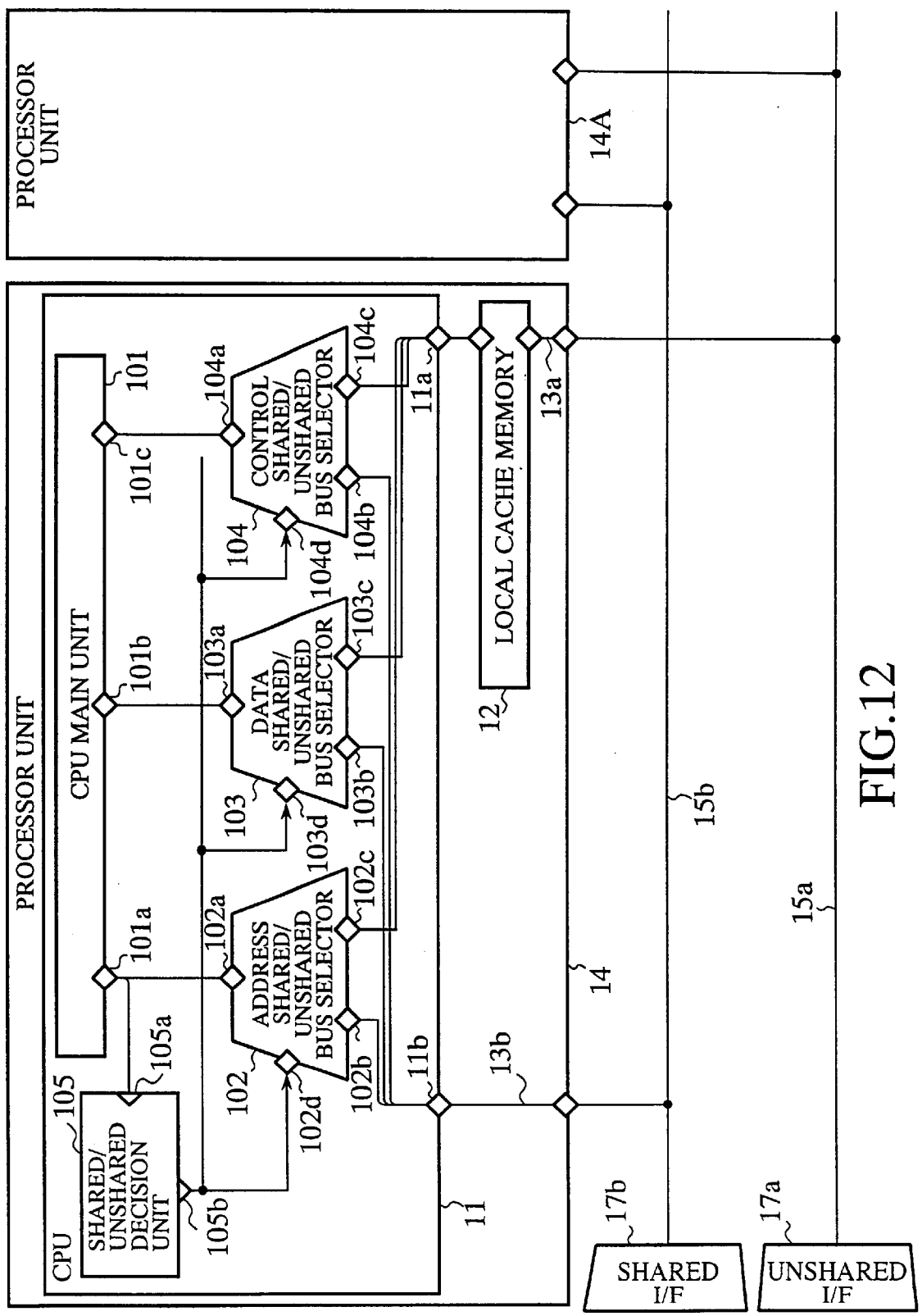
FIG. 12 is a block diagram showing a configuration of an embodiment 10 of the multiprocessor system in accordance with the present invention.

FIG. 12 is a block diagram showing the present embodiment 10 of a multiprocessor system in accordance with the present invention, in which the reference numeral 11 designates the CPU of the embodiment 1 (or of the embodiments based on the embodiment 1). The reference numeral 101 designates an i-th CPU main unit which is not required to have a function to make the shared/unshared decision by itself. The i-th CPU main unit 101 comprises an i-th CPU main unit address bus terminal 101a for outputting an address to be accessed, an i-th CPU main unit data bus terminal 101b for transferring information to be read from or written to the address, and an i-th CPU main unit control bus terminal 101c for supplying control information of the i-th CPU itself such as read or write.

The reference numeral 102 designates an i-th address shared/unshared bus selector that comprises an i-th CPU address selector CPU side terminal 102a connected to the i-th CPU main unit address bus terminal 101a of the i-th CPU main unit 101, an i-th address selector shared side terminal 102b, an i-th address selector unshared side terminal 102c and an i-th address selector decision input terminal 102d. The i-th address shared/unshared bus selector 102 connects the i-th CPU address selector CPU side terminal 102a to the i-th address selector shared side terminal 102b when the i-th address selector decision input terminal 102d receives the information "shared", but to the i-th address selector unshared side terminal 102c when it receives the information "unshared".

The reference numeral 103 designates an i-th data shared/unshared bus selector that comprises an i-th CPU data selector CPU side terminal 103a connected to the i-th CPU main unit data bus terminal 101b of the i-th CPU main unit 101, an i-th data selector shared side terminal 103b, an i-th data selector unshared side terminal 103c and an i-th data selector decision input terminal 103d. The i-th data shared/unshared bus selector 103 connects the i-th CPU data selector CPU side terminal 103a to the i-th data selector shared side terminal 103b when the i-th data selector decision input terminal 103d receives the information "shared", but to the i-th data selector unshared side terminal 103c when it receives the information "unshared".

The reference numeral 104 designates an i-th control shared/unshared bus selector that comprises an i-th CPU control selector CPU side terminal 104a connected to the i-th CPU main unit control bus terminal 101c of the i-th CPU main unit 101, an i-th control selector shared side terminal 104b, an i-th control selector unshared side terminal 104c and an i-th control selector decision input terminal 104d. The i-th control shared/unshared bus selector 104 connects the i-th CPU control selector CPU side terminal 104a to the i-th control selector shared side terminal 104b when the i-th control selector decision input terminal 104d receives the information "shared", but to the i-th control selector unshared side terminal 104c when it receives the information "unshared".

The i-th CPU 11 comprises an (i,1)-th shared bus terminal 11a and an (i,1)-th unshared bus terminal 11b. The wiring from the (i,1)-th unshared bus terminal 11b is divided within the i-th CPU 11 into three parts consisting of address, data and control buses, which are connected to the i-th address selector shared side terminal 102b of the i-th address shared/unshared bus selector 102, i-th data selector shared side terminal 103b of the i-th data shared/unshared bus selector 103 and i-th control selector shared side terminal 104*b* of the i-th control shared/unshared bus selector 104, respectively.

Likewise, the wiring from the (i,1)-th shared bus terminal 11*a* is divided within the i-th CPU 11 into three parts consisting of address, data and control buses, which are connected to the i-th address selector unshared side terminal 102*c* of the i-th address shared/unshared bus selector 102, i-th data selector unshared side terminal 103*c* of the i-th data shared/unshared bus selector 103 and i-th control selector unshared side terminal 104*c* of the i-th control shared/unshared bus selector 104, respectively.

The reference numeral 105 designates an i-th shared/unshared decision unit that comprises an address bus input terminal 105*a* connected to the i-th CPU main unit address bus terminal 101*a*, and an i-th selector decision output terminal 105*b* connected to the i-th address selector decision input terminal 102*d*, i-th data selector decision input terminal 103*d* and i-th control selector decision input terminal 104*d* of the i-th address shared/unshared bus selector 102, i-th data shared/unshared bus selector 103 and i-th control shared/unshared bus selector 104, respectively. The i-th shared/unshared decision unit 105 can be a fixed circuit for deciding the shared/unshared in response to the address information to be accessed.

The present embodiment 10 employs a very simple method of deciding the shared or unshared from the address to be accessed. A user divides in advance addresses (for example, 0000-7FFF) into which the shared data is placed, and addresses (for example, 8000-FFFF) into which the unshared data is placed. The user produces programs in accordance with the address information thus divided.

Receiving a data access instruction during program decoding, the i-th CPU main unit 101 outputs information indicative of "read" or "write" from the control input/output terminal, outputs when performing a read operation an address to be accessed from the address bus input/output terminal, and outputs when carrying out the write operation an address from the address bus input/output terminal and data to be written from the data bus input/output terminal.

Subsequently, the i-th shared/unshared decision unit 105 receives the data information the i-th CPU main unit 101 outputs, and makes a decision about its address whether it is an address to which the shared data is assigned or the unshared data is assigned. Then, the i-th shared/unshared decision unit 105 transfers through the i-th selector decision output terminal 105*b* the information indicative of "the shared data is accessed" or "the unshared data is accessed" to the i-th address selector decision input terminal 102*d*, i-th data selector decision input terminal 103*d* and i-th control selector decision input terminal 104*d* of the i-th address shared/unshared bus selector 102, i-th data shared/unshared bus selector 103 and i-th control shared/unshared bus selector 104, respectively. The i-th address shared/unshared bus selector 102, i-th data shared/unshared bus selector 103 and i-th control shared/unshared bus selector 104 connect the buses in response to the information.

Thus dividing the shared/unshared in accordance with the assigned address is very effective in simplifying the logic circuit of the i-th shared/unshared decision unit 105. When dividing the shared/unshared according to the groups of addresses 0000-7FFF and 8000-FFFF, the i-th shared/unshared decision unit 105 can be implemented by adding an inverter to the most significant bit of the address lines at most. Thus, the functional load for dividing the shared/unshared is rather light, thereby enabling the functional load to be reduced as compared with the conventional system.

Besides, the i-th CPU main unit can be replaced by a common CPU without a shared/unshared decision function, and individual shared/unshared decision units along with a decision device can be provided as peripheral circuits. Since the common CPU (without the shared/unshared decision function) can be used, the cost can be reduced. In addition, since the i-th shared/unshared decision unit 105 consists of a simple selector, it is cheap though the number of components increases. It is impossible for the user, however, to change the memory assignment between shared and unshared areas because this method determines it when fabricating the CPU.

Embodiment 11

The present embodiment 11 relates to a second shared/unshared decision method—a second decision method according to address.

Figure 13:
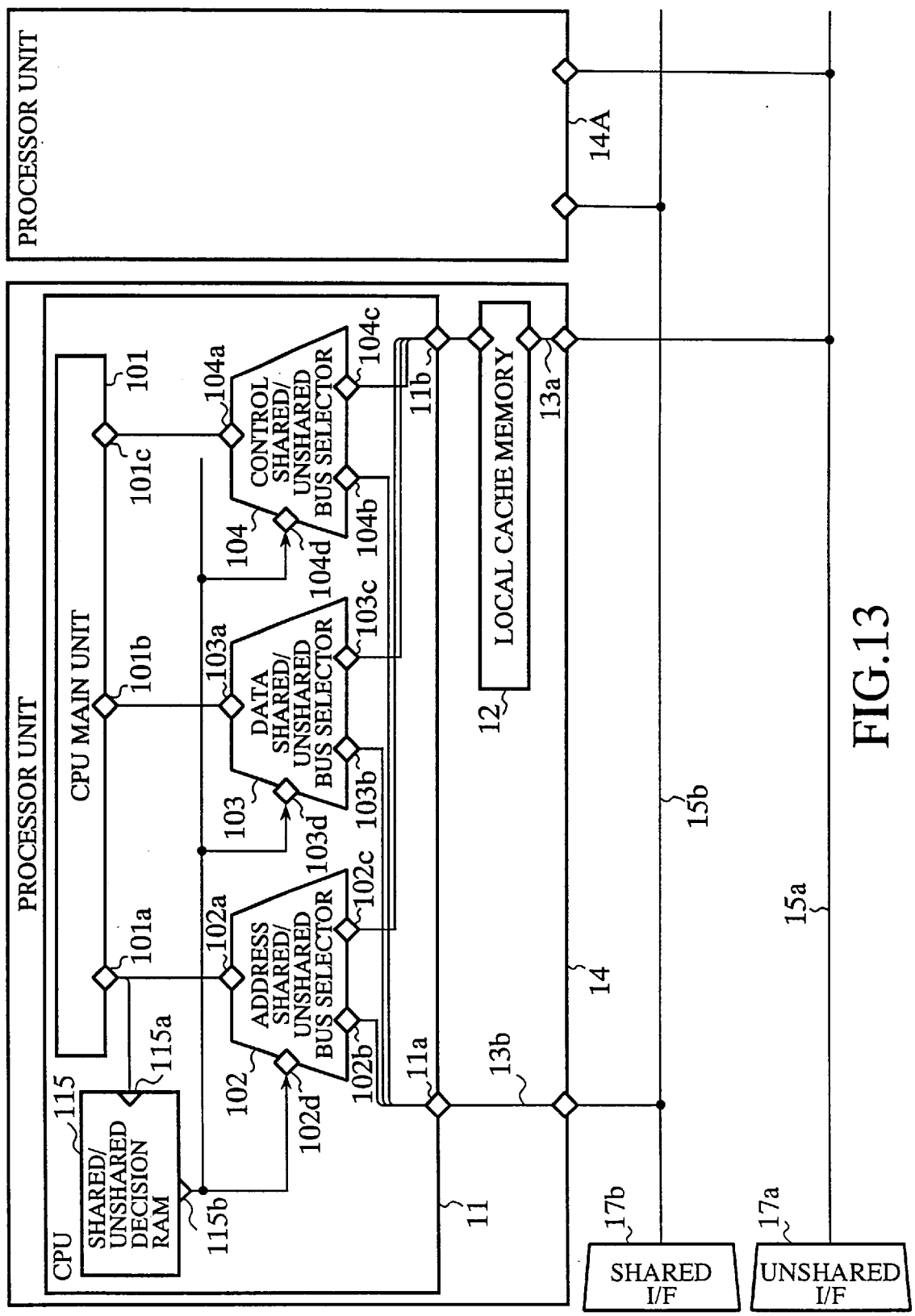
FIG. 13 is a block diagram showing a configuration of an embodiment 11 of the multiprocessor system in accordance with the present invention.

FIG. 13 is a block diagram showing the present embodiment 11 of a multiprocessor system in accordance with the present invention, which employs as a shared/unshared decision unit an i-th shared/unshared decision RAM 115 that inputs the address information and outputs the shared/unshared information for the address (or block).

In the present embodiment 11, the high speed i-th shared/unshared decision RAM 115 inputs an upper address (eight bits, for example) of an access address. The i-th shared/unshared decision RAM 115 stores information about whether the address is associated with shared or unshared data, and transfers that information to the shared/unshared decision line. Although not shown in this figure, it is easy to rewrite the information of the i-th shared/unshared decision RAM 115. For example, it is possible to design such that the i-th shared/unshared decision RAM 115 is accessed when the upper eight bits are "00".

This will enable a user to determine the shared/unshared areas to some extent. No problem will take place if the i-th shared/unshared decision RAM 115 has an infinite capacity, thought it is limited in practice. As a result, it is nearly impossible to set the shared/unshared decision on a byte by byte basis. Besides, since this method checks merely the upper address, only a fixed block boundary and fixed length can be designated.

Embodiment 12

The present embodiment 12 relates to a third shared/unshared decision method—a third decision method according to address.

Figure 14:
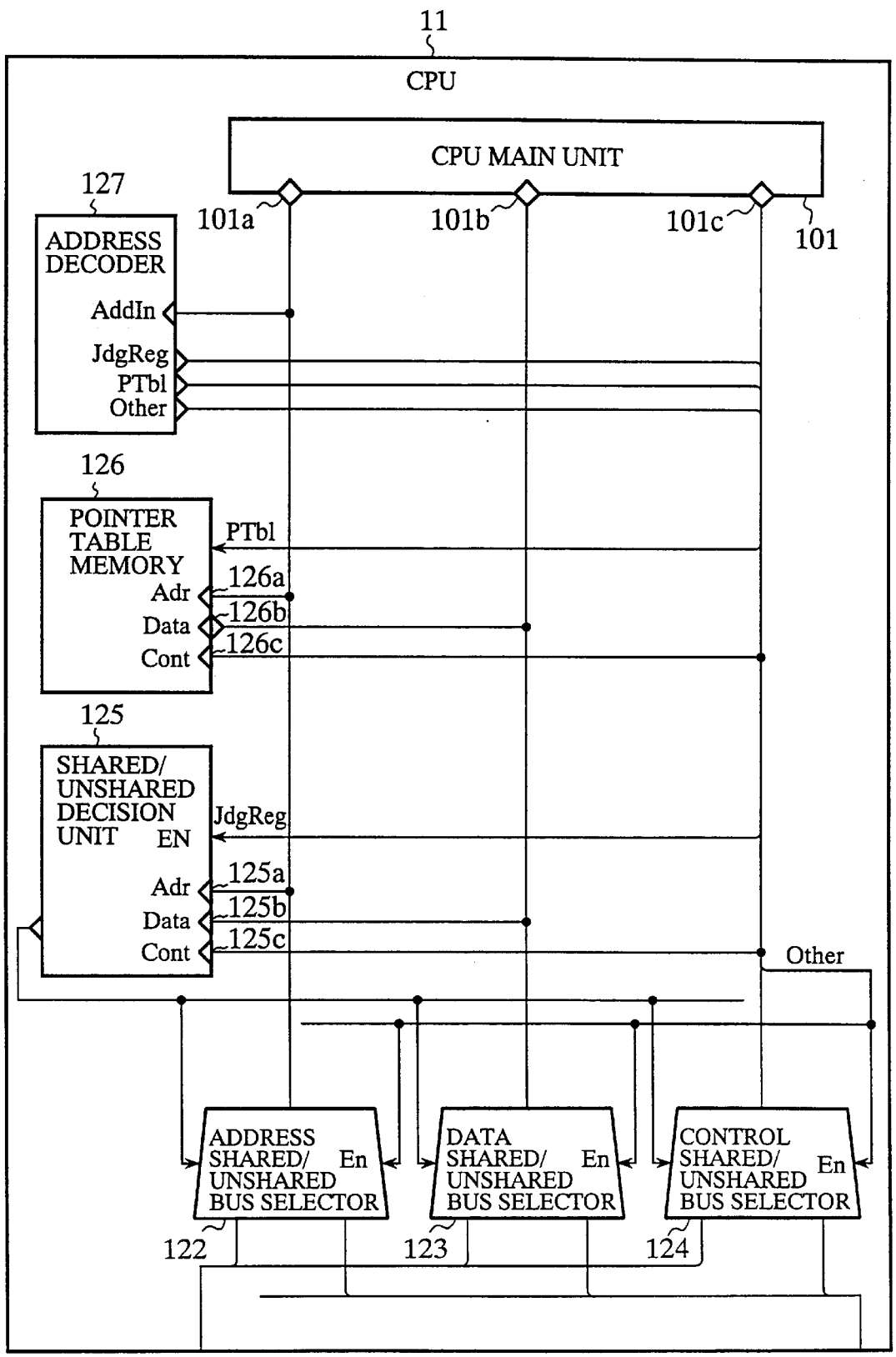
FIG. 14 is a block diagram showing a major portion of a configuration of an embodiment 12 of the multiprocessor system in accordance with the present invention.

FIG. 14 is a block diagram showing the present embodiment 12 of a multiprocessor system in accordance with the present invention, in which the i-th CPU main unit 101 comprises an i-th CPU main unit address bus terminal 101*a* for indicating the address to be accessed, an i-th CPU main unit data bus terminal 101*b* for transferring information which is read from or to be written into the address, and an i-th CPU main unit control bus terminal 101*c* for producing i-th CPU control information such as read or write.

The reference numeral 127 designates an i-th address decoder that determines a device to be accessed according to the address, and has signal lines "JdgReg", "PTbl" and "Other". In the present embodiment, the i-th address. decoder 127 outputs an enable signal from the "JdgReg" when one of the addresses 0000-00FF is designated, from the "PTbl" when one of the addresses 0100-03FF is designated, and from the "Other" when one of the remaining addresses is designated. Since each of the enable signal controls the operations of devices, it is handled as one of the control signals.

An i-th address shared/unshared bus selector 122, i-th data shared/unshared bus selector 123 and i-th control shared/unshared bus selector 124 each include an enable terminal En, and operate as in the embodiment 10 when receiving the enable signals at the enable terminals En. In contrast, when receiving input signals other than the enable signals, they do not connect the i-th CPU main unit address bus terminal 101a, i-th CPU main unit data bus terminal 101b and i-th CPU main unit control bus terminal 101c of the i-th CPU main unit 101 neither to the shared terminals nor to the unshared terminals of the i-th address, data and control selectors.

The enable terminals En of the bus selectors 122-124 are connected to the "Other" terminal of the i-th address decoder 127 so that they connect the buses when the i-th CPU main unit 101 accesses one of the addresses 0400-FFFF, and disconnect all the buses when it accesses one of the addresses 0000-03FF.

An i-th shared/unshared decision unit 125 comprises an address input terminal 125a, a data input terminal 125b and a control input terminal 125c, which are connected to the i-th CPU main unit address bus terminal 101a, i-th CPU main unit data bus terminal 101b and i-th CPU main unit control bus terminal 101c of the i-th CPU main unit 101, respectively. The i-th shared/unshared decision unit 125 is connected to the signal line "JdgReg" of the control bus of the CPU, and has a latch so that it is enabled and becomes accessible when the CPU accesses one of the addresses 0000-00FF and the i-th address decoder 127 outputs the enable signal from the "JdgReg" terminal.

The reference numeral 126 designates an i-th pointer table memory that comprises an address input terminal 126a, data input terminal 126b and control input terminal 126c, which are connected to the i-th CPU main unit address bus terminal 101a, i-th CPU main unit data bus terminal 101b and i-th CPU main unit control bus terminal 101c of the i-th CPU main unit 101, respectively. The i-th pointer table memory 126 is connected to the signal line "PTbl" of the control bus of the CPU, and has a latch so that it is enabled and becomes accessible when the CPU accesses one of the addresses 0100-03FF and the i-th address decoder 127 outputs the enable signal from the "PTbl" terminal.

Figure 15:
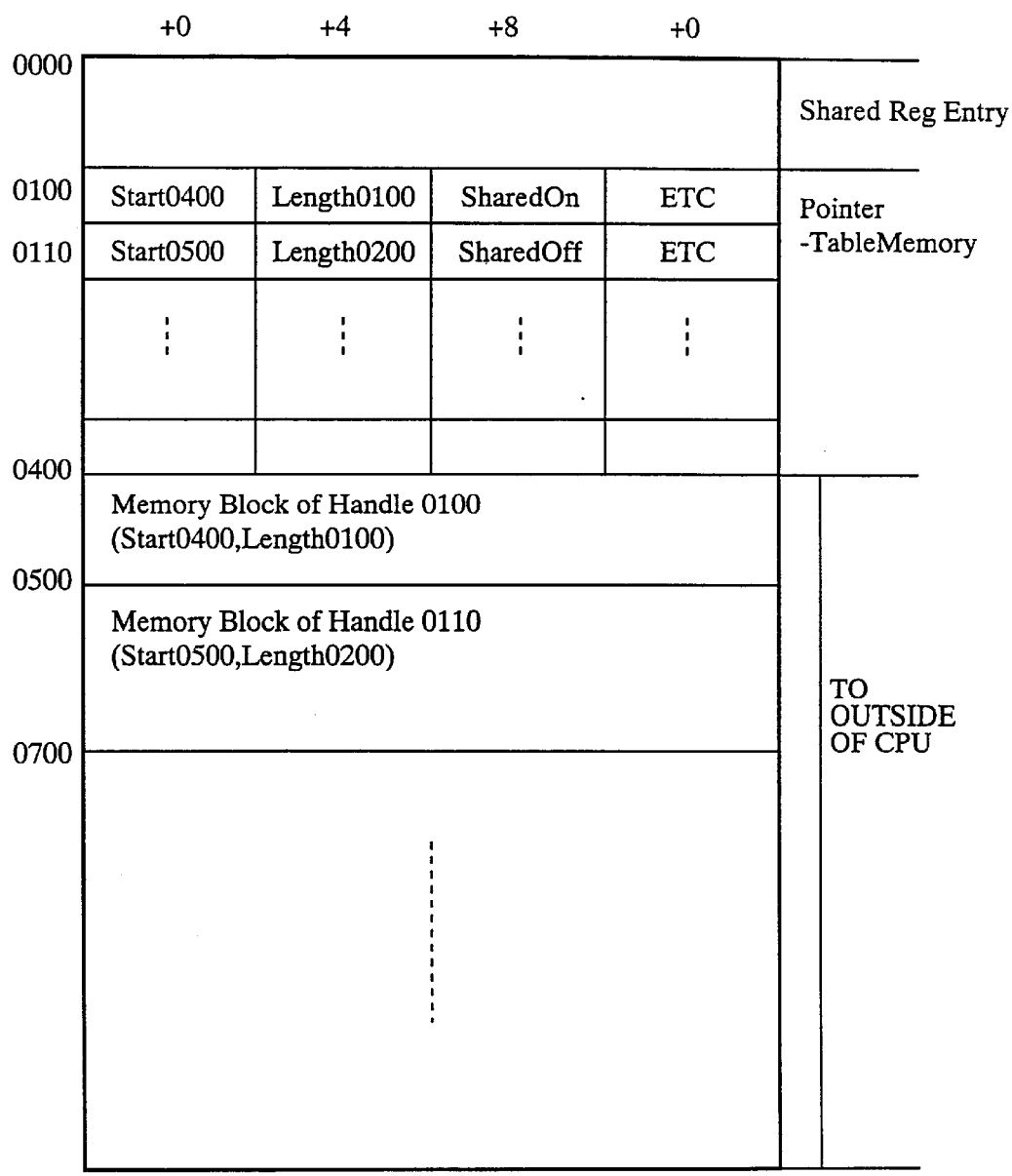
FIG. 15 is a memory map of the embodiment 12.

To make clearly, a memory map seen from the i-th CPU main unit 101 of the present embodiment 12 is shown in FIG. 15.

The present embodiment 12 employs a computer configuration which carries out the memory management using a software tool called "Handle" (which is described in detail in "Inside Macintosh Vols. I and II", edited by Apple Computer and published by Berkley Publishing Corp, and incorporated here by reference).

First, when using part of the memory (0400-04FF, for example) as one of the memory blocks, the initial address (0400) and the length (256 bytes=0100 (Hex) bytes) of the memory block are paired to describe a particular address in the pointer table (here, "0400" is placed in the address 0100, and "0100" in the address 0104). An access to the memory block is made by means of software using the address (0100) of the pointer table, whose content points the initial address of the memory block. The address on the pointer table is referred to as "Handle". Thus, when a user program accesses a particular location in the memory block (the eighth address from the start address of the memory block, for example), the CPU reads the content of the handle (that is, the content 0400 of the address 0100), and accesses the address (0407) which is acquired by adding to the content (0400, the content of the address 0100) the addend (8−1). The computer configuration employed in the present embodiment implements these operations entirely by software.

Figure 16:
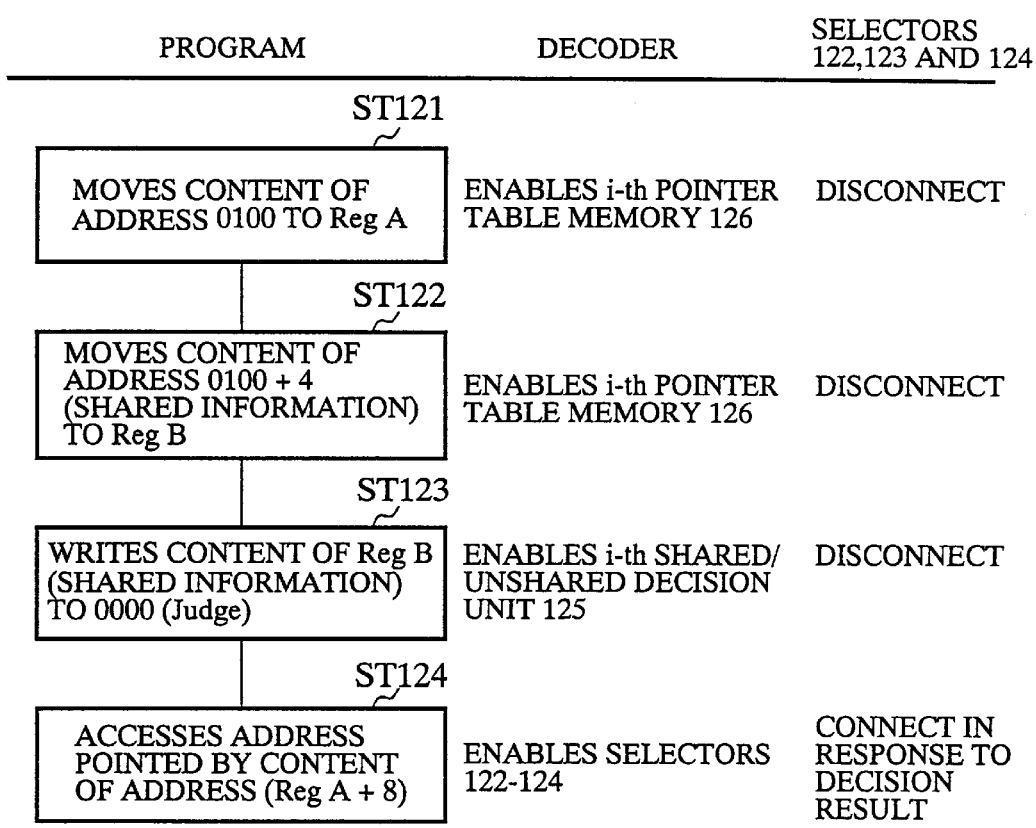
FIG. 16 illustrates memory access software of the embodiment 12.

The present embodiment adds "shared/unshared" bits to the information of the pointer table memory 126 as shown in FIG. 15, the operation of which will now be described with reference to FIG. 16. When accessing the particular location of the memory block (the eighth address from the start address of the memory block, for example), the user program reads the content of the handle (address 0100 whose content is 0400) at step ST121 in FIG. 16.

In this case, the i-th address decoder 127 enables the access only to the i-th pointer table memory 126 so that the i-th CPU main unit 101 can read the content of the address 0100 in the pointer table memory 126. In the course of this, the buses are disconnected because the i-th address shared/unshared bus selector 122, i-th data shared/unshared bus selector 123 and i-th control shared/unshared bus selector 124 are disenabled. Subsequently, the user program reads at step ST122 the shared/unshared bit (shared information) from the pointer table memory 126 in the same manner as in step ST121.

Then, at step ST123, the user program accesses the i-th shared/unshared decision unit 125 by writing the shared information into a given address in the addresses 0000-00FF. In the course of this, the shared/unshared bus selectors 122, 123 and 124 keep the buses disconnected.

Finally, at step ST124, when the i-th CPU main unit 101 accesses the address (0407) obtained by adding the addend (8−1=7) to the content of the handle (address 0100 whose content is 0400), the shared/unshared bus selectors 122, 123 and 124, starting their operation by the enable signals from the address decoder 127, make a decision as to the shared or unshared, and connect to the desired buses in response to their decision result.

[Further Degree of Freedom Concerning the Boundary is Possible]

Comparing the present embodiment 12 with the foregoing embodiment 11, although the embodiment 11 can set the shared/unshared of the block only at a fixed boundary and a fixed length, the present embodiment 12 can set the shared/unshared of the block at any desired boundary (initial address) and length. It should be noted in the present embodiment 12, however, that the access to the unshared areas of the other CPUs must be inhibited. In addition, since the decision on the shared/unshared is made by the CPU by means of software (it is rather difficult to achieve this with hardware), a small delay cannot be avoided in the memory access.

Although not shown in a figure, if the i-th CPU main unit 101 has such a function that its particular internal register can output its written content immediately without change, that register can share the role of the i-th shared/unshared decision unit 125 (let it be a register B). This will enable the step ST123 to be omitted, thereby increasing the speed. To incorporate such a function in a chip will be possible by providing the i-th CPU main unit 101 with a signal metal line led therefrom and by connecting it to the shared/unshared select terminal.

Here, establishment, deletion and update of the memory block will be described briefly. The pointer table, which originally includes shared information of the CPUs, and is referred to often in the system, is rarely subject to writing involved in the establishment, deletion and update of the memory block (only the case of update will be described below). To achieve the update of the memory block, the CPU that causes the update writes the updated handle and its content in a particular location in the shared area, and subsequently generates an interrupt to all the CPUs so that they read the content and update the content of the i-th pointer table memory 126.

Embodiment 13

The present embodiment 13 relates to a fourth shared/unshared decision method—a fourth decision method according to address.

In the foregoing embodiments 10–12, a method is described, in which the CPUs operating independently are applied, without change, to the embodiments 1–9 of the multiprocessor system. In the present embodiment 13, the CPUs are each provided with an additional desired function to be applied to the multiprocessor system.

In the present embodiment 13, an improved applying method for implementing the shared/unshared decision will be described with the CPUs which carry out the memory management on a segment basis. The concept of segment itself is the same as that of the memory block in the embodiment 12. Segments are described by segment descriptors (corresponding to the pointer table of the embodiment 12), each of which retains information about an initial address (such as address 0400), length (such as 0100 bytes), status bits, etc. The segment descriptors are placed on the segment descriptor table (corresponding to the pointer table of the embodiment 12), and are provided with segment numbers (that are given in the form of 0, 1, 2, . . . , and correspond to the handles of the embodiment 12). When accessing the memory, the CPU reads, with a single instruction, from a stored address of the information about a segment number (7, for example), the initial address (the initial address 0400 of the segment 7) and the status bits, adds to it the relative address (8–1) from it (0400), and accesses that address (0407). This method is characterized by executing the process by hardware with the single instruction in the software. [Strategy for revising the CPU] Conventional CPUs that execute the memory access based on the segment management, however, do not output information on whether they "read segment" or "read segment descriptor". In addition, they do not output information on which segment they are reading now. Thus, it is impossible for an outside device to make the shared/unshared decision based on the segment. Although as a simple method it will be possible to allocate shared segments to the shared area and unshared segments to the unshared area in a system configuration based on the embodiment 10, such a system will be unadaptable.

Writing into the shared/unshared devices by means of software in the memory access as in the embodiment 12 will corrupt compatibility with rich existing software. In view of this, the present embodiment 13 provides each of the CPUs with the shared/unshared decision function by implementing a simple revision of extending to the outside of the CPUs wiring that the CPUs, the black boxes, possess in connection with their original function, and that is enclosed in the CPUs.

Figure 17:
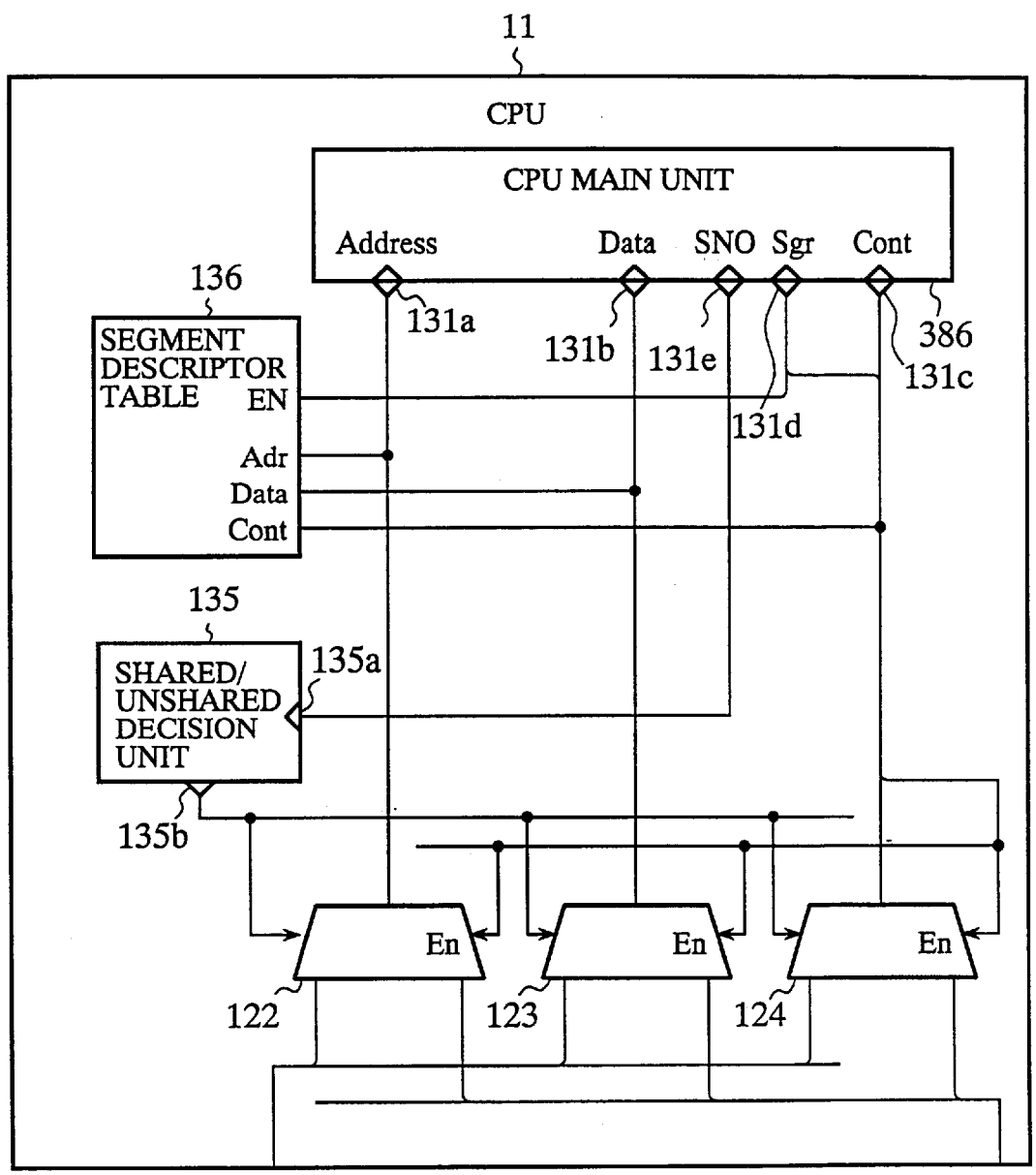
FIG. 17 is a block diagram showing a major portion of a configuration of an embodiment 13 of the multiprocessor system in accordance with the present invention.

FIG. 17 is a block diagram showing a configuration of the embodiment 13 of the multiprocessor system in accordance with the present invention. In FIG. 17, the reference numeral 386 designates a CPU main unit that accesses a memory on a segment basis. The CPU main unit 386 comprises an Sgr terminal 131d for determining whether to read a segment descriptor table or the others. The Sgr terminal 131d outputs electric information "ReadSGT" when it reads the segment descriptor table, and information "AccMem" when it reads the segment. The CPU main unit 386 comprises an SNO terminal 131e for producing a segment number to be accessed when the Sgr terminal 131d outputs the AccMem information.

The SNO terminal 131e outputs the segment number when the CPU actually accesses the memory (Sgr AccMem). Considering the function of the CPU, it is natural to expect that signals corresponding to those terminals are present in the CPU, and hence it is rather simple to lead them out with metal wiring.

The reference numeral 136 designates a segment descriptor table consisting of a RAM. The segment descriptor table 136 comprises an enable terminal EN connected to the Sgr terminal 131d. The segment descriptor table 136 operates in response to the "ReadSGT" that is supplied to the enable terminal EN from the Sgr terminal 131d when the CPU reads the segment descriptor table 136, and outputs a segment descriptor in response to the request of the CPU. Otherwise, the segment descriptor table 136 outputs nothing.

The reference numeral 135 designates a shared/unshared decision unit consisting of RAM, and comprising a segment number input terminal 135a and a shared/unshared decision output terminal 135b. The shared/unshared decision unit 135 itself is similar to the decision unit 115 of the embodiment 11 as shown in FIG. 13, and its input is the segment number (to be accessed) supplied from the SNO terminal 131e of the CPU main unit 386 rather than the upper eight bits of the address. As in the embodiment 11, the shared/unshared decision unit 135 comprises shared/unshared information corresponding to the input segment number (corresponding to the upper eight bits of the address in the embodiment 11), and outputs the shared/unshared information of the segment number from the shared/unshared decision output terminal 135b.

The shared/unshared bus selectors 122, 123 and 124 each comprise an enable terminal EN which is connected to the Sgr terminal 131d of the CPU main unit 386, and carry out the bus connection in response to the shared/unshared decision information when the "AccMem" is supplied to the enable terminal EN. Otherwise, they are disabled, thereby disconnecting all the buses.

Next, the operation of the present embodiment 13 will be described.

The CPU main unit 386 executes, by a single memory access instruction on software, not only a read operation of the segment descriptor table but also an access operation of the segment. When accessing the segment descriptor table 136, the CPU main unit 386 outputs a memory access request in accordance with a predetermined access procedure, and produces the "ReadSGT" signal from the Sgr terminal 131d. The shared/unshared bus selectors 122, 123 and 124 are disabled owing to the "ReadSGT" supplied to their enable terminals connected to the Sgr terminal 131d, and hence all the buses are disconnected.

Although the shared/unshared decision unit 135 may operate, its output is ignored because the shared/unshared bus selectors 122, 123 and 124 are disabled. In contrast, the segment descriptor table 136 starts its operation owing to the "ReadSGT" supplied to its enable terminal EN, and sends the segment descriptor to the CPU main unit 386.

Next, when accessing the segment, the CPU main unit 386 outputs the "ReadMem" from the Sgr terminal 131d and the segment number to be accessed from the SNO terminal 131e. In this case, the segment descriptor table 136 is disabled and outputs nothing because of the "ReadMem" supplied to the enable terminal EN. In contrast, the shared/unshared decision unit 135 receives the segment number output from the SNO terminal 131e of the CPU main unit 386, and produces the shared/unshared decision information about this segment. The shared/unshared bus selectors 122, 123 and 124 connect the buses in response to the shared/unshared decision information because of the "AccMem" signal supplied to their enable terminals EN. In this case, the software is completely unchanged.

According to the present embodiment 13, the individual CPUs (CPU main units) can achieve the shared/unshared decision by implementing a least revision with a minimum effort. Here, the term "effort" refers to extending to the outside of the CPU the terminals corresponding to the Sgr terminal 131d and SNO terminal 131e, that is, providing metal wiring for drawing the terminals out of the CPU.

Since the CPU has the functions associated with these terminals, it is unnecessary to add the functions, enabling the revision to be achieved at a low cost.

Furthermore, although the present method entails the small addition to the internal and external hardware, it requires nothing to be added to the software. This means that the existing software resources are applicable successively without any revision. In addition, although the embodiment 10 has a restriction that when it employs the individual CPUs which carry out the segment management, the shared segments must be stored in the shared area, and the unshared segments must be stored in the unshared area, the present embodiment 13 has an advantage over the embodiment 10 that it is free from that restriction and is flexible.

Incidentally, although processings involved in the generation, update and deletion of the segments, and the update of the information in the shared/unshared decision unit 135 which requires matching with these processings will occur as in the embodiment 12, they rarely occur during the processing, and have little to do with the subject matter of the present invention, the description thereof is omitted here.

Figure 18:
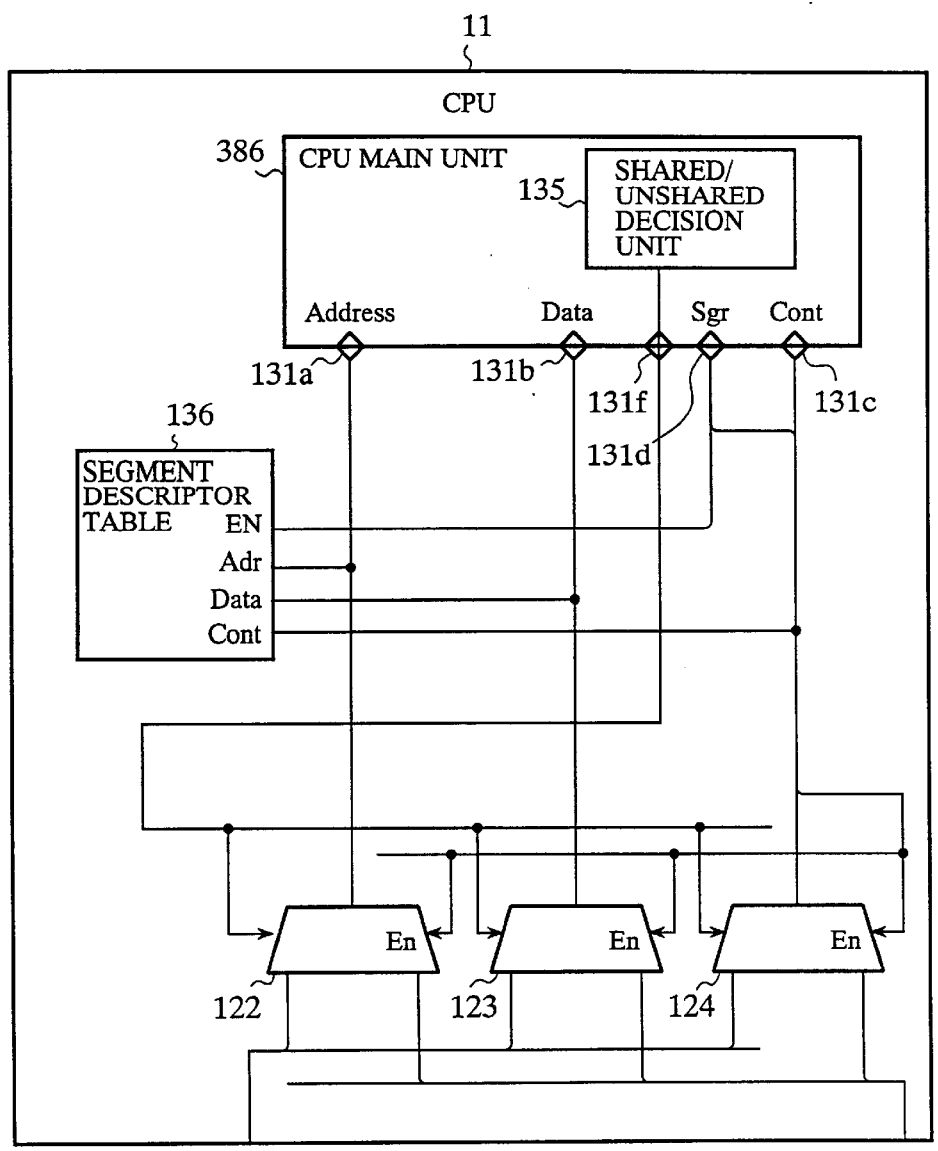
FIG. 18 is a block diagram showing a major portion of another configuration of the embodiment 13 of the multiprocessor system in accordance with the present invention.

Although the present embodiment 13 is based on the assumption that the CPU main unit 386 consists of a single chip, it can also incorporate the shared/unshared decision unit 135 as shown in FIG. 18. In this case, the CPU main unit 386 comprises the Sgr terminal and a shared/unshared decision terminal 131f.

Figure 19:
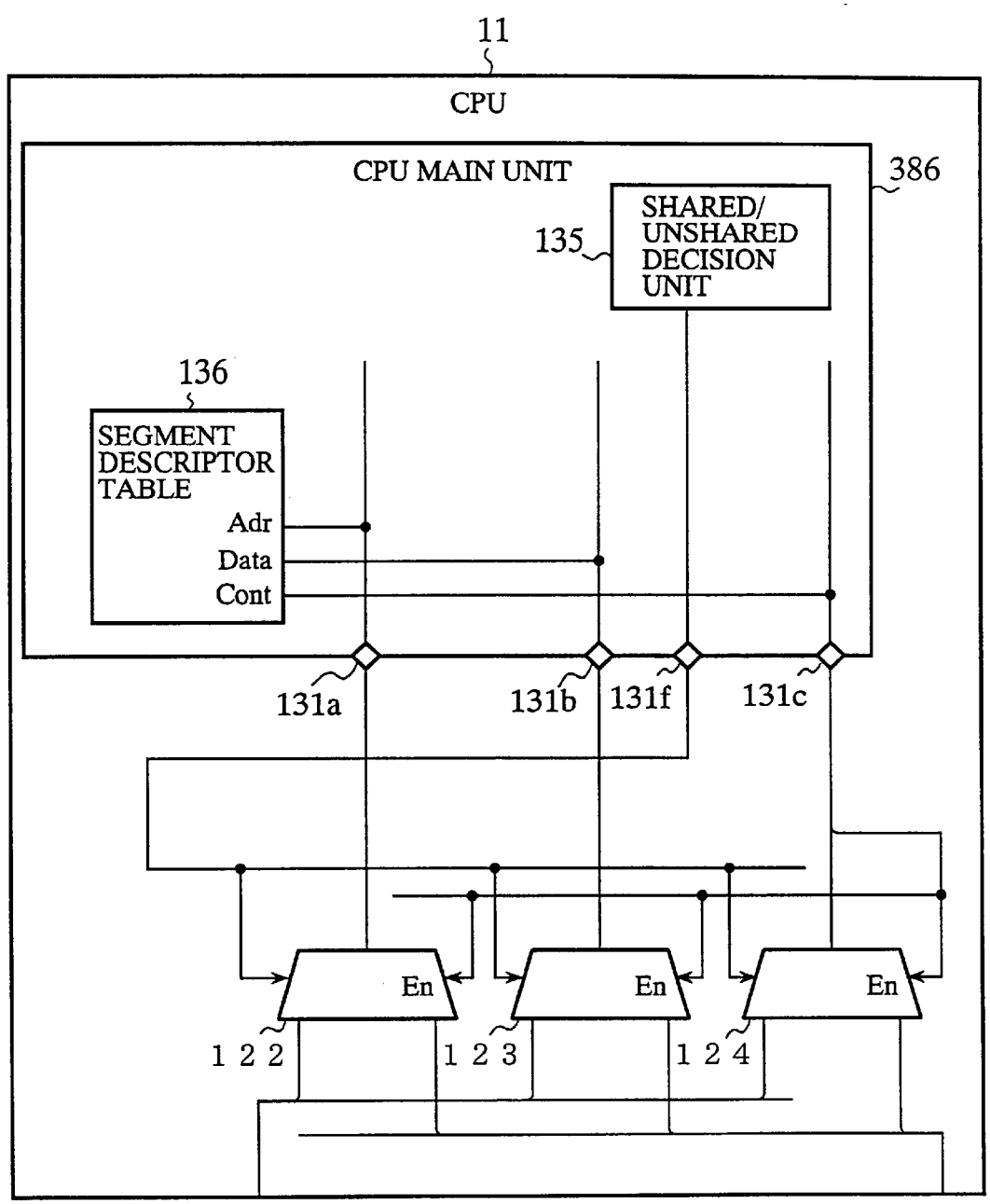
FIG. 19 is a block diagram showing a major portion of a still another configuration of the embodiment 13 of the multiprocessor system in accordance with the present invention.

Although the present embodiment 13 is based on the assumption that the CPU main unit 386 consists of a single chip, it can also incorporate the shared/unshared decision unit 135 and the segment descriptor table 136 as shown in FIG. 19. In this case, the CPU main unit 386 comprises only the shared/unshared decision terminal 131f as an additional terminal.

The shared/unshared decision terminal 131f as shown in FIGS. 18 and 19 can be a terminal of a fixed circuit that achieves the same function as the shared/unshared decision unit 135 does which consist of the RAM. In addition, although the shared/unshared decision unit 135 incorporated into the embodiment 13 makes the decision on the basis of the segments, it can make the decision based on other decision materials.

As described above, the present embodiment 13 employs CPUs that make the shared/unshared decision on the basis of the segments, and applies them to the CPU and cache configuration in accordance with the present invention. FIGS. 18 and 19 show that the shared/unshared decision unit 135 can be incorporated into the CPU. Furthermore, the shared/unshared decision unit 135 may consist of a fixed circuit, or may make the shared/unshared decision by an instruction.

Embodiment 14

[A Complex System]

Figure 20:
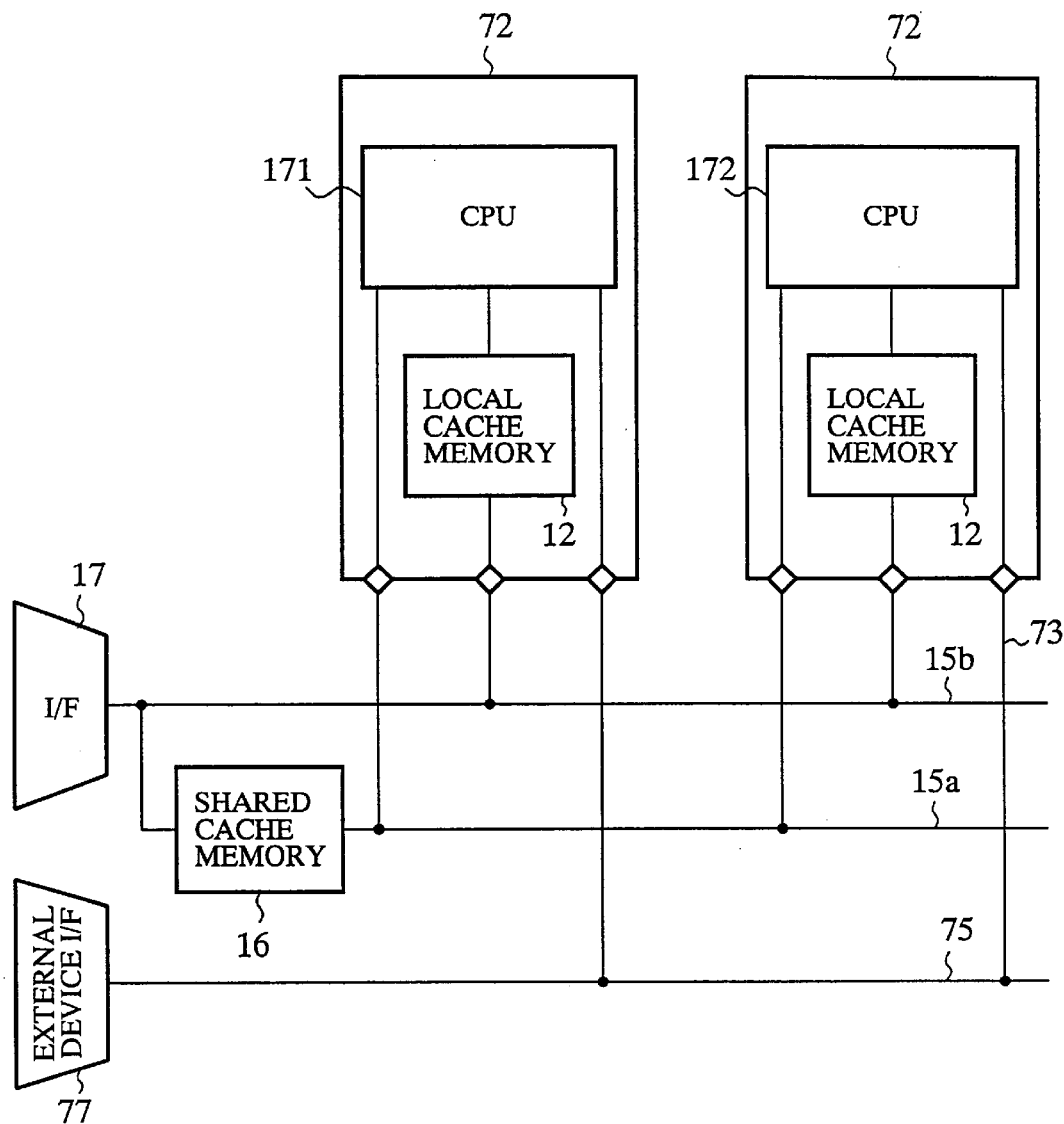
FIG. 20 is a block diagram showing a configuration of an embodiment 14, of the multiprocessor system in accordance with the present invention.
Figure 21:
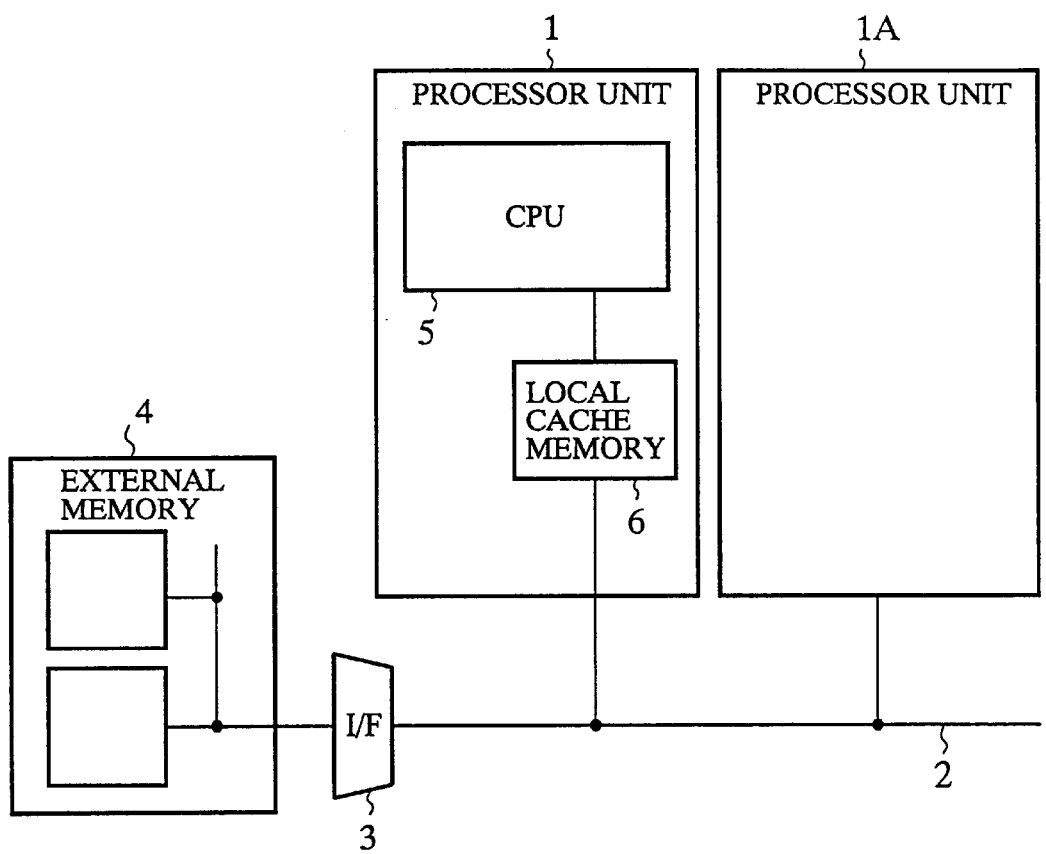
FIG. 21 is a block diagram showing a conventional multiprocessor system.

FIG. 20 is a block diagram showing an embodiment 14 of a multiprocessor system in accordance with the present invention, which is based on the embodiments 12 and 13. In FIG. 20, the reference numeral 171 designates the CPU of the embodiment 12, and 172 designates the CPU of the embodiment 13.

The present embodiment 14 combines two or more different type computer systems into a single system.

Using the present embodiment 14 makes it possible to combine two or more computer systems into a single system as shown in FIG. 20. This offers an advantage that the two or more systems can share one data. The CPUs of the present embodiment 14 are not restricted to those of the embodiments 12 and 13. Any CPUs that can distinguish the shared data from the unshared data, and select the bus in response to that result can configure the CPU and cache system in accordance with the present invention.

What is claimed is:

1. A multiprocessor system comprising:
a plurality of processor units, each of which includes a CPU having a shared bus terminal and an unshared bus terminal, and a local cache memory connected to said unshared bus terminal of said CPU for storing unshared information used by the CPU of the same processor unit;
a plurality of local shared buses, each of which connects, to a global bus, said shared bus terminal of said CPU of each of said plurality of processor units;
a plurality of local unshared buses, each of which connects, to said global bus, a bus terminal of said local cache memory of each of said plurality of processor units; and
an interface for connecting said global bus to an external memory that includes a shared area for storing shared information used in common by the CPUs of all of said plurality of processor units, and an unshared area for storing said unshared information.

2. The multiprocessor system as claimed in claim 1, wherein said global bus comprises a global shared bus connected to said plurality of local shared buses, and a global unshared bus connected to said plurality of local unshared buses.

3. The multiprocessor system as claimed in claim 2, wherein said interface comprises a shared interface for connecting said global shared bus to an external shared memory for storing shared information used in common by the CPUs of all said plurality of processor units; and an unshared interface for connecting said global unshared bus to an external unshared memory for storing said unshared information, said external unshared memory being used in common by the CPUs of all said plurality of processor units.

4. The multiprocessor system as claimed in claim 1, further comprising a global shared cache memory on said global bus interposed between said plurality of processor units and said interface.

5. The multiprocessor system as claimed in claim 2, further comprising a global shared cache memory on said global shared bus interposed between said plurality of processor units and said interface.

6. The multiprocessor system as claimed in claim 3, further comprising a global shared cache memory on said global shared bus interposed between said plurality of processor units and said shared interface.

7. The multiprocessor system as claimed in claim 1, wherein said local cache memory has a write through function.

8. The multiprocessor system as claimed in claim 1, wherein said local cache memory has a write back function.

9. A multiprocessor system comprising:
a plurality of recursive processor units, each of which includes a plurality of processor units, wherein each of said plurality of processor units includes a CPU having a shared bus terminal and an unshared bus terminal, and a local cache memory connected to said unshared bus terminal of said CPU for storing unshared information used by the CPU of the same processor unit, and wherein each of said plurality of recursive processor units further includes an inclusive shared bus terminal to which shared bus terminals of said plurality of processor units are connected, and an inclusive unshared bus terminal to which unshared bus terminals of said plurality of processor units are connected;
a plurality of local shared buses, each of which connects, to a global shared bus, said inclusive shared bus terminal of each of said plurality of recursive processor units;
a plurality of local unshared buses, each of which connects, to a global unshared bus, said inclusive unshared bus terminal of each of said plurality of recursive processor units;
a shared interface for connecting said global shared bus to an external shared memory for storing shared information used in common by the CPUs of all said plurality of processor units; and
an unshared interface for connecting said global unshared bus to an external unshared memory for storing said unshared information, said external unshared memory being used in common by the CPUs of all said plurality of processor units.

10. The multiprocessor system as claimed in claim 9, wherein each of said plurality of processor units further comprises at least one other cache memory for storing unshared information used by the CPU of the same processor unit, and said CPU further comprises at least one other unshared bus terminal connected to said at least one other cache memory, and
wherein said multiprocessor system further comprises at least one other global unshared bus; local unshared buses, each of which connects to said at least one other global unshared bus an unshared bus terminal of said at least one other cache memory of each of said plurality of processor units; and at least one other unshared interface for connecting said at least one other global unshared bus to at least one other external unshared memory for storing said unshared information, said at least one other external unshared memory being used in common by the CPUs of all said plurality of processor units.

11. The multiprocessor system as claimed in claim 9,
wherein said CPU of each of said plurality of processor units further comprises an external device bus terminal, and
wherein said multiprocessor system further comprises a global external device bus; local external device buses, each of which connects to said global device bus said external device bus terminal of said CPU of each of said plurality of processor units; and an external device interface for connecting said global external device bus to an external device.

12. The multiprocessor system as claimed in claim 9, wherein each of said plurality of processor units further comprises a local memory connected to one of input side and output side of said local cache memory.

13. The multiprocessor system as claimed in claim 9, wherein said CPU of said each of said plurality of processor units comprises a CPU main unit including an address terminal, a data terminal and a control terminal; a shared/unshared decision circuit that receives address information from said address terminal, and makes a shared/unshared decision; and a shared/unshared bus selector that receives an output of said shared/unshared decision circuit, connects said terminals of said CPU main unit to said shared bus terminal when said shared/unshared decision circuit makes a shared decision, and connects said terminals of said CPU main unit to said unshared bus terminal when said shared/unshared decision circuit makes an unshared decision.

14. The multiprocessor system as claimed in claim 13, wherein said shared/unshared decision circuit comprises a RAM whose input is an upper part of said address information, and whose output indicates the shared/unshared decision of an address block associated with the upper part of said address information.

15. The multiprocessor system as claimed in claim 13, wherein said shared/unshared decision circuit makes the shared/unshared decision for each segment in accordance with a shared/unshared bit retained in a pointer table of said CPU.

16. The multiprocessor system as claimed in claim 9, wherein said CPU determines a bus to be accessed by making the shared/unshared decision of data from segment information provided when making a memory access.

17. The multiprocessor system as claimed in claim 9, wherein said CPU selects a bus by accessing shared/unshared data with different instructions based on user information.

18. The multiprocessor system as claimed in claim 11, wherein bus terminals of different types of said CPUs are connected in common to said global unshared bus, said global shared bus and said global external device bus.

* * * * *